(12) United States Patent
Frenkel et al.

(10) Patent No.: US 11,193,884 B2
(45) Date of Patent: Dec. 7, 2021

(54) SYSTEM AND METHOD FOR STRUCTURAL CHARACTERIZATION OF MATERIALS BY SUPERVISED MACHINE LEARNING-BASED ANALYSIS OF THEIR SPECTRA

(71) Applicant: The Research Foundation for The State University of New York, Albany, NY (US)

(72) Inventors: Anatoly Frenkel, Great Neck, NY (US); Janis Timosenko, Upton, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 231 days.

(21) Appl. No.: 16/460,117

(22) Filed: Jul. 2, 2019

(65) Prior Publication Data

US 2020/0003682 A1   Jan. 2, 2020

Related U.S. Application Data

(60) Provisional application No. 62/693,117, filed on Jul. 2, 2018.

(51) Int. Cl.
*G01N 21/31* (2006.01)
*G06N 20/00* (2019.01)
*G06N 3/08* (2006.01)

(52) U.S. Cl.
CPC .......... *G01N 21/3103* (2013.01); *G06N 3/08* (2013.01); *G06N 20/00* (2019.01)

(58) Field of Classification Search
None
See application file for complete search history.

(56) References Cited

U.S. PATENT DOCUMENTS

2003/0078740 A1  4/2003 Kieken et al.
2006/0120508 A1  6/2006 Chen et al.
(Continued)

FOREIGN PATENT DOCUMENTS

CN   107817204 A   3/2018
CN   107870205 A   4/2018
(Continued)

OTHER PUBLICATIONS

Timoshenko J. et al., "Wavelet Data Analysis of EXAFS Spectra", Computer Physics Communications 180:920-925 (2009).
(Continued)

*Primary Examiner* — Hoon K Song
(74) *Attorney, Agent, or Firm* — Scully, Scott, Murphy & Presser, P.C.

(57) ABSTRACT

A method of supervised machine learning-based spectrum analysis information, using a neural network trained with spectrum information, to identify a specified feature of a given material, a system for supervised machine learning-based spectrum analysis, and a method of training a neural network to analyze spectrum data. The method of supervised machine learning-base spectrum analysis comprises inputting into the neural network spectrum data obtained from a sample of the given material; and the neural network processing the spectrum data, in accordance with the training of the neural network, and outputting one or more values for the specified feature of the sample of the material. In an embodiment, the training set of data includes x-ray absorption spectroscopy data for the given material. In an embodiment, the training set of data includes electron energy loss spectra (EELS) data.

27 Claims, 11 Drawing Sheets

(56) References Cited

U.S. PATENT DOCUMENTS

| | | |
|---|---|---|
| 2015/0357069 A1 | 12/2015 | Yun et al. |
| 2017/0169910 A1* | 6/2017 | Jia .............................. G21K 7/00 |

FOREIGN PATENT DOCUMENTS

| | | |
|---|---|---|
| KR | 10-2018-0123810 | 11/2018 |
| WO | 2010/146199 A2 | 12/2010 |

OTHER PUBLICATIONS

Timoshenko J. et al., "EXAFS Study of Hydrogen Intercalation into ReO3 Using the Evolutionary Algorithm", Journal of Physics: Condensed Matter 26:055401 (2014).

Kuzmin A. et al., "The Use of X-Ray Absorption Spectra for Validation of Classical Force-Field Models", Z. Phys. Chem. 230(4):537-549 (2016).

Timoshenko J. et al., "Determination of Bimetallic Architectures in Nanometer-Scale Catalysts by Combined Molecular Dynamics Simulations With X-Ray Absorption Spectroscopy", The Journal of Chemical Physics 146:114201 (2017).

Jonane I. et al., "Advanced Approach to the Local Structure Reconstruction and Theory Validation on the Example of the W L3-Edge Extended X-Ray Absorption Fine Structure of Tungsten", Modelling and Simulation in Materials Science and Engineering 26(2):025004 (Jan. 2018).

Dai XD et al., "Extended Finnis-Sinclair Potential for Bcc and Fcc Metals and Alloys", Journal of Physics: Condensed Matter 18:4527-4542 (2006).

Timoshenko J. et al., Supplemental Material for: "Neural Network Approach for Characterizing Structural Transformation by X-Ray Absorption Fine Structure Spectroscopy", Physical Review Letters 120:225502-1225502-6 (2018).

Sutton A.P. et al., "Long-Range Finnis-Sinclair Potentials", Philosophical Magazine Letters 61(3):139-146 (1990).

Gale J.D., "Empirical potential derivation for ionic materials", (1996) Philosophical Magazine Part B, 73:1, pp. 3-19, DOI: 10.1080/13642819608239107, Published online: Sep. 27, 2006.

Gale J.D., "General Utility Lattice Program", Version 4.0, Nanochemistry Research Institute, Molecular Simulation 29, (167 pages) (2003).

Kim S.K. et al., "Ultrathin Films of Cobalt on Fe{001} and the Effect of Oxygen", Physical Review B 54(3):2184-2190 (Jul. 15, 1996).

Hoover W.G., "Canonical Dynamics: Equilibrium Phase-Space Distributions", Physical Review A 31(3):1695-1697 (Mar. 1985).

Hockney R.W., "The Potential Calculation and Some Applications", Methods Comput. Phys. 9:135-211 (1970).

Ankudinov A.L et al., "Real-Space Multiple-Scattering Calculation and Interpretation of X-Ray-Absorption Near-Edge Structure", Physical Review B 58(12):7565-7576 (Sep. 15, 1998).

Frenkel A.I. et al., "Phase Speciation by Extended X-Ray Absorption Fine Structure Spectroscopy", Journal of Chemical Physics 116(21):9449-9456 (Jun. 1, 2002).

Varnell J.A. et al., "Identification of Carbon-Encapsulated Iron Nanoparticles as Active Species in Non-Precious Metal Oxygen Reduction Catalysts", Nature Communications 7:12582 (2016).

Dicicco A. et al., "Novel XAFS Capabilities at ELETTRA Synchrotron Light Source", Journal of Physics Conference Series 190:012043 (2009).

Dicicco A. et al., "Disordered Matter Under Extreme Conditions: X-Ray Diffraction, Electron Spectroscopy and Electroresistance Measurements", Journal of Non-Crystalline Solids 352:4155-4165 (2006).

Liersch A. et al., "The Role of Admixed Hexagonal Boron Nitride in Sintered Steels", Powder Metallurgy Progress 7(2):66-79 (2007).

Furlan K.P. et al., "Microstructural Characterization of Solid State Reaction Phase Formed During Sintering of Hexagonal Boron Nitride with Iron" Microsc. Microanal. 23, 1061-1066 (2017), Accepted Jul. 24, 2017.

Tuckerman M.E. et al., "Statistical Mechanics: Theory and Molecular Simulation" (Oxford University Press, New York, 2010) p. 154.

Toby B.H. et al., "Accuracy of Pair Distribution Function Analysis Applied to Crystalline and Non-Crystalline Materials", Acta Cryst. A48:336-346 (1992).

Frenkel A., "Solving the 3D Structure of Metal Nanoparticles", Z. Kristallogr. 222:605-611 (2007).

Billinge S.J.L. et al., "The Problem With Determining Atomic Structure at the Nanoscale", Science pp. ____ May (2007).

Rehr J.J. et al., "Theoretical Approaches to X-Ray Absorption Fine Structure", Reviews of Modern Physics 72 (3):621-654 (Jul. 2000).

Frenkel A.I. et al., "Synchrotron Techniques for In Situ Catalytic Studies: Capabilities, Challenges, and Opportunities", ACS Catalysis 2:2269-2280 (2012).

Mostafa S. et al., "Shape-Dependent Catalytic Properties of Pt Nanoparticles", J. Am. Chem. Soc. 132 (44):15714-15719 (2010).

Paredis K. et al., "Structure, Chemical Composition, and Reactivity Correlations During the In Situ Oxidation of 2-Propanol", Journal of the American Chemical Society 133:6728-6735 (Jan. 2011).

Bare S.R. et al., "Characterization of Catalysts in Reactive Atmospheres by X-Ray Absorption Spectroscopy", Advances in Catalysis vol. 52:339-465 (2009).

Bordiga S. et al., "Reactivity of Surface Species in Heterogeneous Catalysts Probed by In Situ X-Ray Absorption Techniques", Chemical Reviews 113:1736-1850 (2013) ACS Publications, 2013 American Chemical Society, Published: Feb. 28, 2013.

Norskov J.K. et al., "Towards the computational design of solid catalsts", Nature Chemistry, vol. 1, Apr. 2009, pp. 37-46.

Ulissi Z.W. et al., "To Address Surface Reaction Network Complexity Using Scaling Relations Machine Learning and DFT Calculations", Nature Communications 8:14621 (2017), Published Mar. 6, 2017, pp. 1-7.

Cuenya B.R. et al., "Anomalous Lattice Dynamics and Thermal Properties of Supported Size- and Shape-Selected Pt Nanoparticles", Physical Review B 82:155450-1-155450-8 (2010) published Oct. 28, 2010.

Sanchez S.I. et al., "The Emergence of Nonbulk Properties n Supported Metal Clusters: Negative Thermal Expansion and Atomic Disorder in Pt Nanoclusters Supported on γ-Al2O3", J. Am. Chem. Soc. Received Nov. 25, 2008, 131:7040-7054 (2009).

Matos J. et al., "In Situ Coarsening Study of Inverse Micelle-Prepared Pt Nanoparticles Supported on γ-A12O3: Pretreatment and Environmental Effects", Phys. Chem. Chem. Phys. 14:11457-11467 (2012), Received Apr. 26, 2012, Accepted Jun. 21, 2012.

Ankudinov A.L. et al., "Sensitivity of Pt X-Ray Absorption Near Edge Structure to the Morphology of Small Pt Clusters", Journal of Chemical Physics 116(5):1911-1919, Submitted: Sep. 4, 2001, Accepted: Nov. 14, 2001, Published Online: Jan. 22, 2002.

Bugaev A.L. et al., "In Situ Formation of Hydrides and Carbides in Palladium Catalyst: When XANES is Better Than EXAFS and XRD", Catalysis Today 283:119-126 (2017) Accepted Feb. 15, 2016, Available online Apr. 12, 2016.

Chill S.T. et al., "Probing the Limits of Conventional Extended X-Ray Absorption Fine Structure Analysis Using Thiolated Gold Nanoparticles", ACSNano, vol. 9, No. 4, pp. 4036-4042 (2015), Published online Apr. 8, 2015.

Timoshenko J. et al., "Probing Structural Relaxation in Nanosized Catalysts by Combining EXAFS and Reverse Monte Carlo Methods", Catalysis Today 280:274-282 (2017).

Yevick et al., "Effects of surface disorder on EXAFS modeling of metallic clusters", 2010 The American Physical Society, Physical Review B 81, p. 115451-1-115451-7 (2010).

Clausen et al., "Asymmetric pair distribution functions in catalysts", Topics in Catalysis 10 (2000) Published: May 2000, pp. 221-230.

Witkowska et al., "Local ordering of nanostructured Pt probed by multiple-scattering XAFS", Physical Review B 76, pp. 104110-1-104110-12 (2007), The American Physical Society, Sep. 20, 2007.

Benfatto et al., "MXAN: a new software procedure to perform geometrical fitting of experimental XANES spectra", J. Synchrotron Rad. (2001) 8, pp. 267-269.

Della Longa, et al., "Quantitative Analysis of X-Ray Absorption Near Edge Structure Data by a Full Multiple Scattering Procedyre: The Fe_CO Geometry in Photolyzed Carbonmonoxy-Myoglobin

(56) References Cited

OTHER PUBLICATIONS

Single Crystal", 2001 The American Physical Society, Physical Review Letters, vol. 87, No. 15, Oct. 8, 2001, p. 155501-1-155501-4.

Smolentsev et al., "Three-dimensional local structure refinement using a full-potential XANES analysis", Physical Review B 75, Published: Apr. 18, 2007, p. 144106-1-144106-5 (2007).

Van der Veen et al., "L-edge XANES analysis of photoexcited metal complexes in solution", The Owner Societies 2010, Phys. Chem. Chem. Phys., 2010, 12, pp. 5551-5561 Mar. 17, 2010.

Zhan et al., "Alternative difference analysis scheme combining R-space EXAFS fit with global optimization XANES fit for X-ray transient absorption sepctroscopy", J. Synchrontron Rad. (2017) 24, accepted Apr. 14, 2017, pp. 818-824.

Montavon et al., "Machine Learning of Molecular Electronic Properties in Chemical Compound Space", May 31, 2013, th.fhi-berlin. mpg.de/site/uploads/Publications/QM-NJP_20130315.pdf, 9 pages.

Ramakrishnan et al., "Big Data meets Quantum Chemistry Approximations: The Delta-Machine Learning Approach", https://arxiv.org/abs/1503.04987, Mar. 17, 2015, 14 pages.

Glasner D. et al., "Geometrical Characteristics of Regular Polyhedra: Application to EXAFS Studies of Nanoclusters", AIP Conference Proceedings 882:746 (2007).

Rehr et al., Parameter-free calculations of X-ray spectra with FEFF9, Physical Chemistry Chemical Physics, (2010) 12, Published May 6, 2010, pp. 5503-5513.

Bunau et al., "Self-consistent aspects of x-ray absorption calculations", Journal of Physics: Condensed Matter, IOP Publishing, 2009, 21, Published Aug. 5, 2009, pp. 345501 (11 pages).

Cuenya et al., "Solving the Structure of Size-Selected Pt Nanocatalysts Synthesized by Inverse Micelle Encapsulation", J. Am. Chem. Soc. 2010, 132, Published on Web: Jun. 7, 2020, pp. 8747-8756.

Ankudinov et al., "Theoretical interpretation of XAFS and XANES in Pt clusters", Topics in Catalysis, vol. 18, Nos. 1-2, Jan. 2001, pp. 1-5.

Bazin et al., "Numerical Simulation of the Platinum LIII Edge White Line Relative to Nanometer Scale Clusters", J. Phys. Chem. B 1997, 101, In Final Form: May 2, 1997, pp. 5332-5336.

Timoshenko et al., "Solving local structure around dopants in metal nanoparticles iwth ab initio modeling of X-ray absorption near edge structure", Phys. Chem. Chem. Phys., 2016, 18, Accepted: Jun. 30, 2016 pp. 19621,-19630.

Bhadeshia, "Neural Networks in Materials Science", ISIJ International, vol. 39 (1999), No. 10, Accepted in final form on Jun. 12, 1999, pp. 966-979.

Kuno et al., "Nondestructive Speciation of Solid Mixtures by Multivariate Calibration of X-Ray Absorption Near-Edge Structure Using Artificial Neural Networks and Partial Least-Squares", Analytical Sciences Jun. 2000, vol. 16, 2000 (c) The Japan Society for Analytical Chemistry, pp. 597-602.

Vila et al., "Dynamic structure in supported Pt nanoclusters; Real-time density functional theory and x-ray spectroscopy simulations", Physical Review B 78, 121404(R), published Sep. 11, 2008, 15 pages.

Rehr et al., "Progress in the theory and interpretation of XANES" Science Direct, Coordination Chemistry Reviews vol. 249, Issues 1-2, Jan. 2005, pp. 131-140.

Frenkel, "Solving the structure of nanoparticles by multiple-scattering EXAFS analysis", J. Synchrotron Rad. (1999) 6, pp. 293-295.

Frenkel et al., "Modeling the Structure and Composition of Nanoparticles by Extended X-Ray Absorption Fine-Structure Spectroscopy", Annual Review of Analytical Chemistry 2011,4:23-39, downloaded from www.annualreviews.org by 72.68.147.83 on Jun. 21, 2011, published Feb. 21, 2011, 19 pages.

Timoshenko et al., "Local structure of nanosized tungstates revealed by evolutionary algorithm", Phys. Status Solidi A 212, No. 2, (2015), Jan. 23, 2015, pp. 265-273.

Cuenya et al., "Thermodynamic properties of Pt nanoparticles: Size, shape, support, and adsorbate effects", Physical Review B 84, 245438 (2011), published Dec. 20, 2011, 14 pages.

Tsapatsaris et al., "High throughput In Situ XAFS Screening of Catalysts", CP882, X-ray Absorption Fine Structure—XAFS13, edited by B. Hedman and P. Pianetta, © 2007 American Institute of Physics 978-0-7354-0384-0/07, Downloaded Feb. 19, 2007 to 152. 78.198.66. Redistribution subject to AIP license or copyright, see http://proceedings.aip.org/proceedings/cpcr.jsp, pp. 597-599.

Grunwaldt et al., "Synchrotron Studies of Catalysts: From XAFS to QEXAFS and Beyond", Synchrotron Radiation News 22(1):Jan. 2-4, 2009, 5 pages.

Cuenya et al., "Anomalous lattice dynamics and thermal properties of supported size- and shape-selected Pt nanoparticles" Physical Review B 82, 155450 (2010), published Oct. 28, 2010, pp. 155450-1-155450-8.

Sanchez et al., "The Emergence of Nonbulk Properties in Supported Metal Clusters: Negative Thermal Expansion and Atomic Disorder in Pt Nanoclusters Supported on çAl2O3", JACS Articles, Published on Wed May 4, 2009, J. Am. Chem. Soc. 2009, 131, pp. 7040-7054.

Rehr et al., "Parameter-free calculations of X-ray spectra with FEFF9", Perspective, www.rsc.org/pccp, Phys. Chem. Chem. Phys., 2010, 12, First published as an Advance Article on the web May 6, 2010, pp. 5503-5513.

Bunau et al., "Self-consistent aspects of x-ray absorption calculations", J. Phys.: Condens. Matter 21 (2009) 345501, Published Aug. 5, 2009, (11 pages).

Edwards et al., "High Temperature Structure and Thermal Expansion of Some Metals as Determined by X-Ray Diffraction Data. I. Platinum, Tantalum, Niobium, and Molybdenum", Journal of Applied Physics, vol. 22, No. 4, Apr. 1951, pp. 424-428.

Glasner et al., "Geometrical Characteristics of Regular Polyhedra: Application to EXAFS Studies of Nanoclusters", AIP Conference Proceedings, 882, 13th International Conference, Stanford CA, Jul. 9-14, 2006, Published Online: Feb. 15, 2007, 3 pages.

Ankudinov et al., "Sensitivity of Pt x-ray absorption near edge structure to the morphology of small Pt clusters", J. Chem. Phys. 116, 1911 (2002); https://doi.org/10.1063/1.1432688, 2002 American Institute of Physics, Published online: Jan. 22, 2002.

Bazin et al., "Numerical Simulation of the Platinum LIII Edge White Line Relative to Nanometer Scale", 1997 American Chemical Society, J. Phys. Chem. B 1997, 101, May 2, 1997, pp. 5332-5336.

Abadi et al., "TensorFlow: Large-Scale Machine Learning on Heterogeneous Distributed Systems". Google Research, Preliminary White Paper: Nov. 9, 2015, arXiv:1603.04467v2 [cs.DC] Mar. 16, 2016, pp. 1-19.

Rehr et al., "Progress in the theory and interpretation of XANES", Science Direct, Coordination Chemistry Reviews 249 (2005) available online Apr. 12, 2004, pp. 131-140.

Timoshenko et al., "EXAFS study of hydrogen intercalation into ReO3 using the evolutionary algorithm", J.Phys.: Condens. Matter 26 (2014) 055401, Published Jan. 16, 2014 (15 pages).

Ankudinov et al., "Real-space multiple-scattering calculation and interpretation of x-ray-absorption near-edge structure", Physixal Review B, vol. 58, No. 12, Sep. 15, 1998, pp. 7565-7576.

Timoshenko et al., "Wavelet data analysis of EXAFS spectra", Computer Physics Communications 180 (2009) Available online Dec. 24, 2008 pp. 920-925.

Timoshenko et al., "Reverse Monte Carlo modeling of thermal disorder in crystalline materials from EXAFS spectra", Computer Physics Communications 183 (2012), available online Feb. 6, 2012, pp. 1237-1245.

Timoshenko et al., "Probing structural relaxation in nanosized caalysts by combining EXAFS and revers Monte Carlo methods", Catalysis Today 280 (2017) Available online Aug. 8, 2016, pp. 274-282.

Timoshenko et al., Local structure of nanosized tungstates revealed by evolutionary algorithm, Phys. Status Solidi A 212, No. 2, pp. 265-273 (2015) Published online Jan. 23, 2015.

(56) References Cited

OTHER PUBLICATIONS

Sutton et al., "Long-range Finnis-Sinclair potentials", (1990) Philosophical Magazine Letters, 61:3, 139-146, DOI: 10.1080/09500839008206493, Published Aug. 20, 2006, pp. 139-146.
He et al., "Highly active atomically dispersed CoN4 fuel cell cathode catalysts derived from surfactant-assisted MOFs carbon-shell confinement strategy", Energy Environ Sci., 2019, 12, Accepted Oct. 23, 2018, pp. 250-260.
Timoshenko J. et al., "Supervised Machine-Learning-Based Determination of Three-Dimensional Structure of Metallic Nanoparticles", J. Phys. Chem. Lett. 2017, 8, Published: Sep. 29, 2017, pp. 5091-5098.
Timoshenko J. et al., "Supervised Machine Learning-Based Determination of Three-Dimensional Structure of Metallic Nanoparticles", Department of Material Science and Chemical Engineering, Stony Brook University, Stony Brook, NY 11794, Center for Functional Nanomaterials, Computational Science Initiative, Division of Chemistry, Brookhaven National Laboratory, Upton, NY 11973, pp. S1-S16.
Timoshenko J. et al., "Neural Network Approach for Characterizing Structural Transformations by X-Ray Absorption Fine Structure Spectroscopy", 2018 American Physical Society, Physical Review Letters 120, 225502 (2018), Published: May 31, 2018, pp. 22502-1-22502-6.
Cohen R.E., "Origin of Ferroelectricity in Perovskite Oxides", Letters to Nature 358:136-138 (Jul. 9, 1992).
Levin I. et al., "Local Structure in Perovskite (Ba,Sr) TiO3: Reverse Monte Carlo Refinements from Multiple Measurements Techniques", Physical Reviews B 89:024106-1-024106-7 (2014).
Aksel E. et al., "Local Atomic Structure Deviation from Average Structure of Na0.5Bi0.5TiO3: Combined X-Ray and Neutron Total Scattering Study", Physical Review B 87:104113-1-104113-10 (2013).
Comes R. et al., "The Chain Structure of BaTiO3 and KNbO3", Solid State Communications 6:715-719 (1968).
Moriarty P., "Nanostructured Materials", Reports on Progress in Physics 64:297-381 (2001).
Billinge S.J.L. et al., "The Problem With Determining Atomic Structure at the Nanoscale", Science 316:561-565 (Apr. 27, 2007).
Fischer F.D. et al., "On the Role of Surface Energy and Surface Stress in Phase-Transforming Nanoparticles", Progress in Materials Science 53:481-527 (2008).
Stern E.A., "Local Premelting About Impurities", Physical Review Letters 60(18):1872-1875 (May 2, 1988).
Stern E.A. et al., "Thermal Vibration and Melting from a Local Perspective", Physical Review B 43(11 ):8850-8860 (Apr. 15, 1991).
Kadau K. et al., "Micioscopic View of Structure Phase Transitions Induced by Shock Waves", Science 296:1681-1684 (May 31, 2002).
Tao F. et al., "In Situ Studies of Chemistry and Structure of Materials in Reactive Environments", Science 331:171-174 (Jan. 14, 2011).
Welnic W. et al., "Unravelling the Interplay of Local Structure and Physical Properties in Phase-Change Materials", Nature Materials 5:56-62 (Dec. 2005).
Mathon O. et al., "Dynamics of the Magnetic and Structural α-ε Phase Transition in Iron", Physical Review Letters 93:255503 (2004).
Ping Y. et al., "Solid Iron Compressed Up to 560 GPa", Physical Review Letters 111:065501 (Aug. 2013).
Stern E.A., "X-Ray Absorption: Principles, Applications, Techniquest of EXAFS, SEXAFS, and XANES", "Theory of EXAFS", Department of Physics, University of Washington, Seattle, Washington, edited by D. Koningsberger and R. Prins (John Wiley and Sons, New York, NY, 1988), Chapter 1, p. 3.
Purans J. et al., "Isotopic Effect in Extended X-Ray-Absorption Fine Structure of Germanium", Physical Review Letters 100:055901-1-055901-4 (Mar. 2008).
Sandstrom D.R., "Developments in Extended X-Ray Absorption Fine Structure Applied to Chemical Systems", Ann. Rev. Phys. Chem. 30:215-238 (1979).
Prins R et al., "X-Ray Absorption: Principles, Applications, Techniquest of EXAFS, SEXAFS, and XANES", "Theory of EXAFS", Department of Physics, University of Washington, Seattle, Washington, edited by D. Koningsberger and R. Prins (John Wiley and Sons, New York, NY, 1988), Chapter 8, pp. 322-323.
Wang F.M. et al., "Iron Bcc-Hcp Transition: Local Structure from X-Ray-Absorption Fine Structure", Physical Review B 57(10):5647-5654 (Mar. 1998).
Yaakobi B. et al., "EXAFS Measurement of Iron Bcc-to-Hcp Phase Transformation in Nanosecond-Laser Shocks", Physical Review Letters 95:075501-1-075501-4 (Aug. 2005).
Aquilanti G. et al., "Melting of Iron Determined by X-Ray Absorption Spectroscopy to 100 GPa", PNAS 112 (39):12042-12045 (Sep. 29, 2015).
Torchio R. et al., "Probing Local and Electronic Structure in Warm Dense Matter: Single Pulse Synchrotron X-Ray Absorption Spectroscopy on Shocked Fe", Scientific Reports 6:26402 (2016).
Crozier E D et al., "X-Ray Absorption: Principles, Applications, Techniquest of EXAFS, SEXAFS, and XANES", "Theory of EXAFS", Department of Physics, University of Washington, Seattle, Washington, edited by D. Koningsberger and R. Prins (John Wiley and Sons, New York, NY, 1988), Chapter 9, p. 373.
Wang L., "Discovering Phase Transitions With Unsupervised Learning", Physical Review Letters B 94:195105 (Nov. 2016).
Zhu Q. et al., "Predicting Phase Behavior of Grain Boundaries With Evolutionary Search and Machine Learning", Nature Communications9(467) (2018).
Zhang P. et al., "Machine Learning Topological Invariants With Neural Networks", Phys. Rev. Lett. 120:066401 (Feb. 2018).
Basinski Z.S. et al., "The Lattice Expansion of Iron", Proceedings of the Royal Society A 229(1179):459-467 (May 1955).
Krasko G.L. et al., "Energetics of BCC-FCC Lattice Deformation in Iron", Physical Review B Condensed Matter 140(17):11536-11545 (Dec. 1989).
Okatov S..V. et al., "Effect of magnetic state on the Gamma—Alpha transition in iron: First-principle calculations of the Bain transformation path", Phys. Rev.B79, 094111 (2008) Sep. 20, 2008.
Ou X., "Molecular Dynamics Simulations of Fcc-to-Bcc Transformation in Pure Iron: A Review", Materials Science and Technology 33(7):822-835 (2017).
Bos C. et al., "Molecular Dynamics Simulation of Interface Dynamics During the Fcc-Bcc Transformation of a Martensitic Nature", Physical Review B 73:104117 (2006).
Billinge S.J.L. et al., "Probing the Short-Range Order and Dynamics of Phase Transitions Using Neutron Powder Diffraction", J. Phys. Chem Solids 57(10):1457-1464 (1996).
Katayama Y. et al., "A First-Order Liquid-Liquid Phase Transition in Phosphorus", Nature 403:170-173 (Jan. 13, 2000).
Shibuta Y. et al., "A Molecular Dynamics Study of the Phase Transition in Bcc Metal Nanoparticles", The Journal of Chemical Physics 129:1441002 (2008).
Calvo F. et al., "Segregation, Core Alloying, and Shape Transitions in Bimetallic Nanoclusters: Monte Carlo Simulations", Physical Review B 77:121406(R) (2008).
Frenkel A.I., "Applications of Extended X-Ray Absorption Fine-Structure Spectroscopy to Studies of Bimetallic Nanoparticle Catalysts", Chem. Soc. Rev. 41:8163-8178 (2012).
Frenkel A.I. et al., "An In Situ Study of Bond Strains in 1 nm Pt Catalysts and Their Sensitivities to Cluster-Support and Cluster-Adsorbate Interactions", The Journal of Physical Chemistry C 117:23286-23294 (2013), ACS Publications 2013 American Chemical Society (2013) Published Oct. 11, 2013.
Filipponi A. et al., "X-Ray-Absorption Spectroscopy and n-Body Distribution Functions in Condensed Matter. I. Theory", Physical Review B 52(21):15122 (Dec. 1995).
Bunker G., "Application of the Ratio Method of EXAFS Analysis to Disordered Systems", Nuclear Instruments and Methods 207:437-444 (1983).
Newville M., "EXAFS Analysis Using FEFF and Feffit", J. Synchrotron Rad. 8:96-100 (2001).
Kuzmin A. et al., "EXAFS and XANES Analysis of Oxides at the Nanoscale", IUCrJ 1:571-589 (2014).

(56) References Cited

OTHER PUBLICATIONS

Gurman SJ et al., "Reverse Monte Carlo Simulation for the Analysis of EXAFS Data", J. Phys. Condens. Matter 2:9463-9473 (1990).
Dicicco A. et al., "Is There Icosahedral Ordering in Liquid and Undercooled Metals?", Physical Review Letters 91 (13):135505 (Oct. 2003).
Ershov N.V. et al., "A New Interpretation of EXAFS Spectra in Real Space II", Phys. Stat. Sol. (b) 108:103-111 (Nov. 1981).
Frenkel A.I. et al., "Redistribution of La-Al Nearest-Neighbor Distances in the Metallic Glass Al0.91La0.09", Physical Review B 54(2):884-892 (Jul. 1996).
Hemminger J.C., "Challenges at the Frontiers of Matter and Energy: Transformative Opportunities for Discovery Science", 78 pages, U.S. Department of Energy (Nov. 2015).

\* cited by examiner

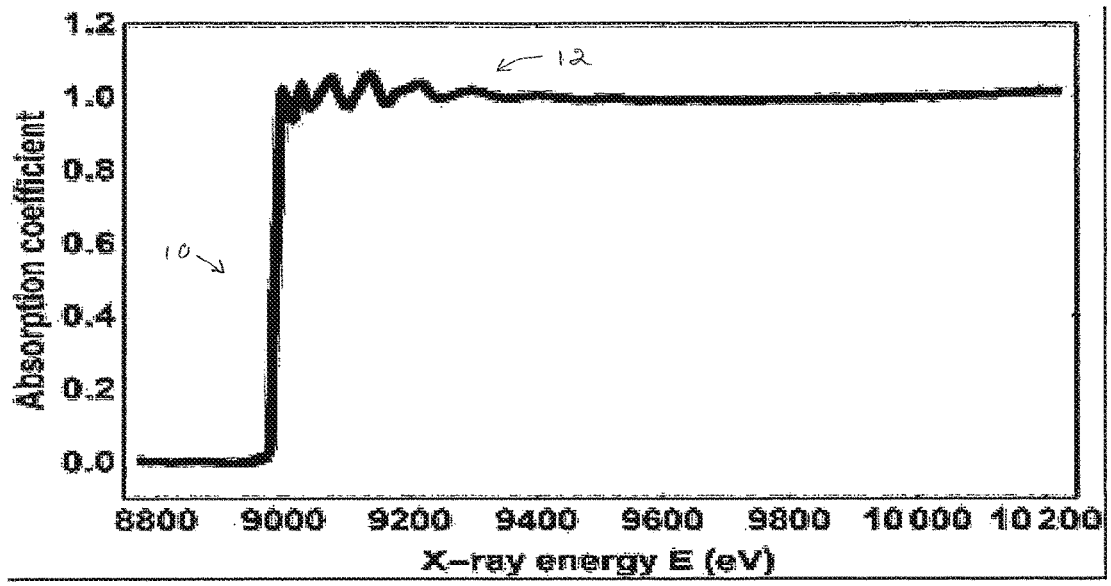
Fig. 1    X-ray absorption spectrum of Cu metal.
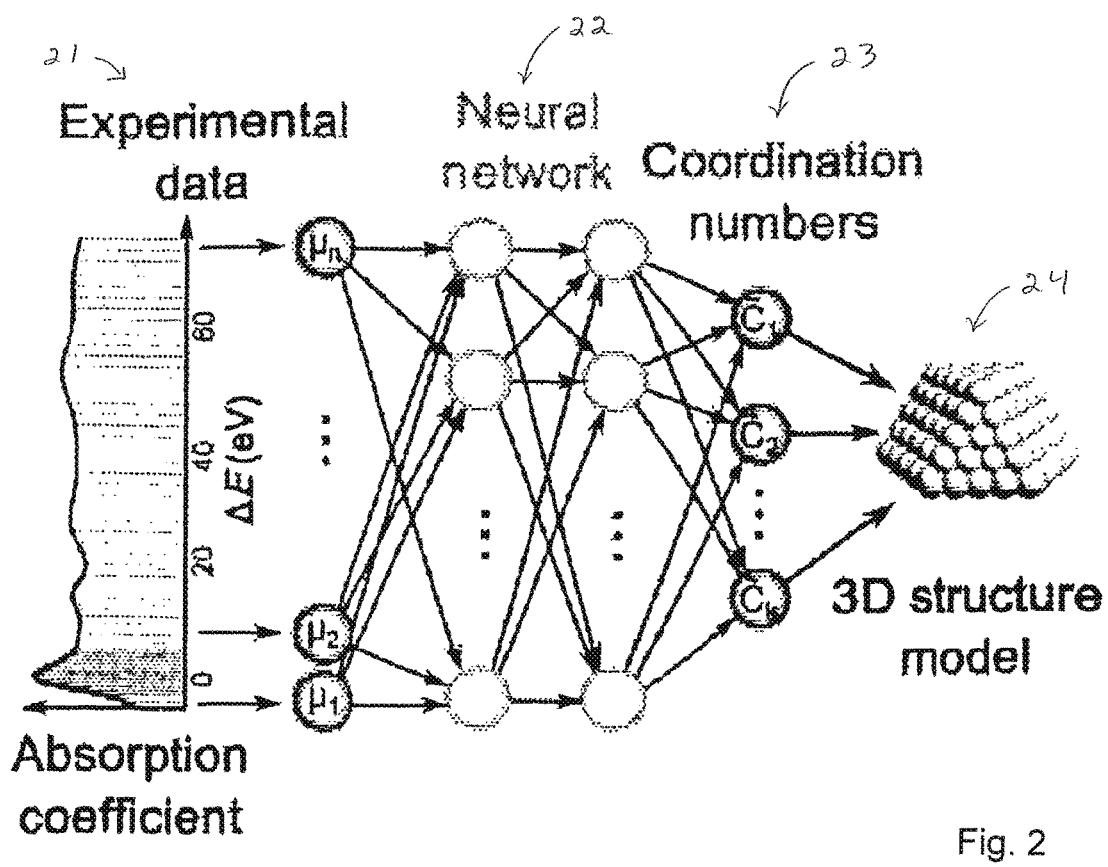
Fig. 2

SYSTEM AND METHOD FOR STRUCTURAL CHARACTERIZATION OF MATERIALS BY SUPERVISED MACHINE LEARNING-BASED ANALYSIS OF THEIR SPECTRA

CROSS REFERENCE TO RELATED APPLICATIONS

This application claims priority to and the benefits of U.S. Provisional Patent Application Ser. No. 62/693,117, filed Jul. 2, 2018, the entire contents and disclosure of which are hereby incorporated herein by reference.

STATEMENT OF GOVERNMENT INTEREST

This invention was made with Government support under Contract No. DE-FG02-03ER15476 awarded by the Department of Energy, and under Contract No. NSF-DMR-1006232 awarded by the National Science Foundation. The Government has certain rights in this invention.

BACKGROUND

This invention generally relates to supervised machine learning-based analysis of spectra measured for materials. More specifically, the invention relates to using materials' spectra, such as X-ray absorption spectroscopy (XAS) or electron energy loss spectra (EELS) data, and supervised machine-learning to extract information from those spectra on the structures of those materials.

X-ray absorption spectroscopy (XAS) is a widely used technique to determine local atomic structure and/or electronic structure of matter. X-ray absorption spectroscopy data are obtained by measuring transmission and/or yield of fluorescent x-rays or secondary electrons of an element in a material as a function of incident x-ray energy over an energy range with sufficiently narrow energy band that corresponds to an absorption edge of an element of interest, at which the incident x-ray photon has sufficient energy to excite core electron.

SUMMARY OF THE INVENTION

In an embodiment, the invention provides a method of supervised machine learning-based spectrum analysis, using a neural network trained with spectrum information to identify a specified feature of a given material. In an embodiment, the method comprises inputting into the neural network spectrum data obtained from a sample of the given material; and the neural network processing the spectrum data obtained from the sample of the material, in accordance with the training of the neural network, and outputting one or more values for the specified feature of the sample of the material.

In an embodiment, the specified feature includes a structural parameter of the given material.

In an embodiment, the sample of the material comprises a given type of nanoparticles. Nanoparticles are particles of up to 100 nanometers and comprising from one to thousands of atoms.

In embodiments, the specified feature includes a set of coordination numbers of a coordination shell of the given type of nanoparticles.

In embodiments, the specified feature includes a radial distribution function of atoms in the sample of the material, and the material's spectra data input into the neural network is obtained from the sample of the given material.

In an embodiment, the invention provides a system for supervised machine learning-based spectrum. In an embodiment, the system comprises a neural network trained with spectrum information to identify a specified feature of a given material. The neural network is for receiving spectrum data obtained from a sample of the given material; and for processing the spectrum data obtained from the sample of the material, in accordance with the training of the neural network, and outputting one or more values for the specified feature of the sample of the material.

In an embodiment, the processing the spectrum data obtained from the sample of the material includes processing x-ray absorption near-edge spectroscopy data obtained from the sample of the material to determine the one or more values for the specified feature of the sample of the material.

In an embodiment, the processing the spectrum data obtained from the sample of the material includes identifying spectral regions, in the data, relevant for structure determination of the sample of the material, based on information extracted from the training.

In an embodiment, the invention provides a method of training a neural network to analyze spectrum data. In an embodiment, the method comprises inputting into the neural network a training set of data including spectrum data obtained from a given material, the neural network including a multitude of nodes arranged in a plurality of layers, each of the nodes having an associated value, and said spectrum data being associated with a true value for a specified feature of the given type of material; the neural network processing said training set of data and outputting an output value for the specified feature of the given type of material; and adjusting the values of the nodes of the neural network to achieve a defined relationship between the output value of the neural network for the specified feature of the given type of material and the true value for said specified feature.

In an embodiment, the adjusting the values of the nodes of the neural network to achieve a defined relationship between the output value of the neural network for the specified feature of the given type of material and the true value for said specified feature includes adjusting the values of the nodes of the neural network to minimize the difference between the output value of the neural network for the specified feature of the given type of material and the true value for said specified feature.

In an embodiment, the training set of data are theoretical data constructed using spectra simulations.

In an embodiment, the training set of data includes x-ray absorption spectroscopy data for the given material.

In an embodiment, the training set of data includes electron energy loss spectra (EELS) data.

Embodiments of the invention described herein provide a system and method for supervised machine learning analysis of x-ray absorption fine structure spectra. The system and method enables quick quantitative, lab- and synchrotron-based characterization of materials composition and 3D structure using x-ray absorption spectroscopy (XAS) data collected at synchrotron radiation facilities or with commercial instruments such as benchtop XAS, as well as using electron energy loss spectra (EELS) collected with commercial electron microscopes, which contain information analogous to that in XAS spectra. The neural networks relating the spectra and unknown material structure are constructed using the method for XAS and EELS data for a large variety of samples and incorporated in the data analysis package that is distributed to the end users of the commercial products for analysis of their data.

Tracking the structure of heterogeneous catalysts under operando conditions remains a challenge due to the paucity of experimental techniques that can provide atomic-level information for catalytic metal species. Embodiments of the invention use x-ray absorption spectroscopy (XAS), which includes x-ray absorption near-edge structure (XANES) and extended x-ray absorption fine structure (EXAFS) spectroscopies, and supervised machine learning (SML) for refining the 3D geometry of metal nanoparticles. SML is used to unravel the hidden relationship between the XANES features and catalyst geometry. To train the SML method, embodiments of the invention rely on ab initio XANES and EXAFS simulations. This approach allows one to solve the structure of a metal catalyst from its experimental XANES, as demonstrated herein by reconstructing the average size, shape, and morphology of well-defined platinum nanoparticles. This method is applicable to the determination of the nanoparticle structure in operando studies and can be generalized to other nanoscale systems. This method also allows on-the-fly XANES and EXAFS analysis and is a promising approach for high-throughput and time-dependent studies.

BRIEF DESCRIPTION OF THE SEVERAL VIEWS OF THE DRAWINGS

FIG. 1 shows an X-ray absorption spectrum of Cu metal.

FIG. 2 illustrates a method and system, in accordance with an embodiment of the invention, for determination of three-dimensional structure of nanoparticles.

DETAILED DESCRIPTION

Figure 3A:
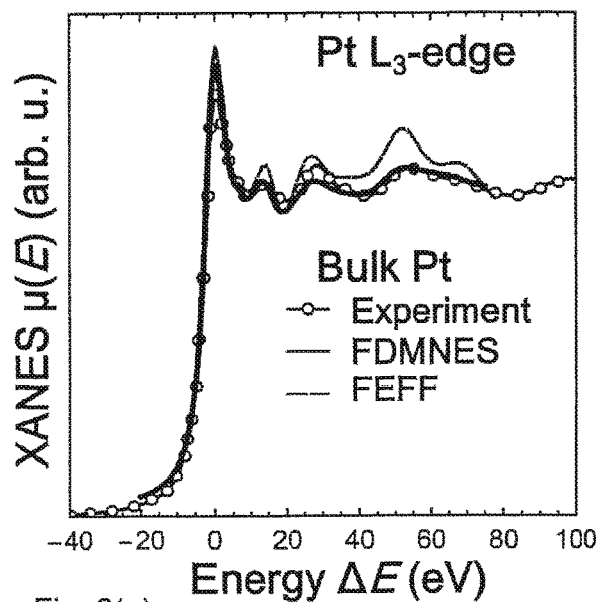
FIG. 3(a) shows experimental and theoretically calculated spectra for platinum foil.

Embodiments of the invention provide for supervised machine learning analysis of X-ray absorption fine structure spectra. X-ray absorption fine structure (XAFS) spectroscopy is an experimental technique that measures a spectrum from a sample that contains one or more elements. The spectrum shows variations in the X-ray absorption coefficient as a function of X-ray energy. FIG. 1 shows the X-ray absorption spectrum of Cu metal. The portion 10 of the spectrum near the step ("edge") is called XANES, the rest of the data 12 is referred to as EXAFS.

The general name for the XAFS technique refers to both XANES and EXAFS portions of the X-ray absorption spectrum (FIG. 1). Both XANES and EXAFS contain information about geometry of nearest atoms around an X-ray absorbing atoms. The main purpose of the measurement is to obtain such information. For well-defined materials, such as known chemical compounds and their mixtures, such information can be extracted from XANES using linear combination methods. For industrially important novel nanomaterials such as metal catalysts, as well as many types of dilute and disordered materials, no analysis method exists that would "translate" the spectrum into a three-dimensional structural information about the investigated material from XANES data. The challenge is that there is no analytical equation that can be fit to the data and obtain the unknown structural variables (an inverse approach).

Instead, the analysis of XANES is commonly done by a direct approach. A model is constructed for which theoretical XANES spectrum is calculated using available first principle calculations (FEFF, FDMNES, and others) and the theory is then compared with experiment. Such method of analysis is model-dependent and cannot span a large range of parameter space (bond distances, angles and numbers of neighbors) in real operation conditions because XANES calculations are time consuming.

The EXAFS portion of the spectrum can be analyzed by inverse techniques using analytical equation. The problem is that, due to the Nyquist criterion, relatively few characteristics can be extracted from the data by using that method of EXAFS data analysis, especially when the data are obtained in harsh conditions of in situ experiment when the noise in the data limits the available spectral range for analysis. In addition, for significantly disordered materials the information about the distribution of atoms in real space cannot be obtained by this method because it is based on the commonly used approximation where the atoms at similar interatomic distances are grouped in a few "coordination shells", and the distribution of distances within each group is assumed to be quasi-Gaussian. For disordered materials, such as nanomaterials and materials experiencing structural transformations such as phase transitions, this approximation is not valid. Hence, just as in the case of the XANES spectrum, the knowledge of the 3D structure of materials can be reliable extracted from EXAFS by conventional methods only when moderate deviations from the known average structure exists, that is, for a narrow range of technologically important materials and processes.

In addition to the synchrotron X-ray sources that are capable to collect high quality XANES and EXAFS spectra, there exist a number of commercially available instruments for materials analysis by X-ray and electron spectroscopies that access only a near edge portion of the absorption spectrum (XANES, in X-ray spectroscopy, and EELS (Electron Energy Loss Spectroscopy) in electron microscopy experiment). Those instruments are a useful alternative to synchrotrons for measuring a wide variety of commercially important materials.

To summarize the existing challenges:

1) For local structural analysis of materials, existing XAFS analysis methods assume specific structural models for comparing with experiment. In the case when materials are either strongly disordered, have nanoscale nature and/or need to be studied in extreme conditions, the currently used analysis methods either cannot be applied or lead to incorrect results; and 2) Commercial instruments that detect X-ray absorption, emission or electron loss spectra are limited in the amount of quantitative information about the material because of the lack of suitable analysis methods.

The system and method of this invention simultaneously solve both challenges because it allows to obtain the correspondence between the spectrum and the material's structure and thus solve the "inverse problem." The system and method include the use of theoretical XANES or EXAFS calculations by existing software programs, to train a supervised machine learning routine, such as an artificial neural network (NN), to reveal the relationships between spectral features and three-dimensional structural characteristics. The trained NN is then used to extract structural information from the experimental XANES or EXAFS data. The method can be extended to other experimental spectroscopy data, where: (i) the corresponding signal is sensitive to 3D atomic arrangements in the material; and (ii) can be reliably modeled. As examples one can mention electron energy loss spectroscopy (EELS) that contain similar information to XANES, or X-ray emission spectroscopy that also has sensitivity to the local atomic geometry. There are commercial companies making instruments for collecting XANES, EXAFS, EELS and XES spectra. The use of those instruments would benefit from the new method because the data they obtain will be analyzed at much greater level of detail than is presently possible.

Embodiments of the invention provide important advantages. One significant advantage is that, by using a sample set of well-defined metal nanoparticles with size and shape control as an example, the system and method demonstrates that XANES spectra in nanostructures can be translated into real-space information about the coordination environment of metal atoms. The system and method demonstrate that only by using neural networks was it possible to extend the sensitivity of this technique to the fourth coordination shell and thus to enable the determination of particle sizes and shapes. In contrast to the existing XANES analysis methods, such as linear algebra-based methods, where the spectra from a small number of existing compounds are required for analysis, the supervised machine learning—based method explores greater portion of parameter space. Unlike the existing multiple scattering (MS) EXAFS or reverse Monte Carlo (RMC)-EXAFS methods, the system and method XANES-based approach does not require high-quality EXAFS data and thus enables advanced analysis of the nanoparticle structure in laboratory-based sources, at high temperatures, with diluted samples on X-rays absorbing supports and in complex sample environments. In addition, the XANES data obtained using a data collection mode with high energy resolution benefits from the use of the system and method.

EXAFS spectrum of a material is related to the distribution of atoms in three dimensional space. The information about this distribution can be obtained through the radial distribution function (RDF), describing the number of neighbors at a certain distance from the absorbing atom. Reconstruction of radial distribution function from EXAFS spectra is an ill-posed problem, and relies on additional constraints and assumptions, such as: (i) the shape of the RDF peaks in conventional fitting approaches; (ii) the knowledge of the initial structure model and density of material in reverse Monte Carlo (RMC) simulations; and (iii) the non-negativity and smoothness of the RDF in regularization-like techniques. An important advantage of the system and method disclosed herein is that the system and method resolves these challenges (i-iii) by relying upon on supervised machine learning (SML), where the artificial neural network (NN) is trained on many known structures with known radial distribution functions to obtain the relationship between the RDFs and their corresponding spectra.

Then, the RDF in unknown materials, or unknown transition states during the transformation of one state of material to the other, can be obtained by "inverting" the experimental EXAFS spectrum.

Related spectroscopies, such as X-ray emission spectroscopy (XES) and EELS, are widely used for materials characterization, and their analysis method is limited to the "fingerprinting" approach, in which experimental data are compared against the existing experimental standard compounds. An additional advantage of the system and method disclosed herein is that the system and method enables the use of theoretical calculations and SML methods to "invert" the spectra. Thus, the system and method can be extended to other spectroscopies in which theories are developed for linking structure to a spectrum.

X-ray absorption spectroscopy (XAS) has been used for decades in studies of heterogeneous catalysts and nanostructured materials. Its unique sensitivity to local atomistic structure around absorbing metal species and the possibility to monitor in situ material transformations, distinguish XAS as one of a very few experimental methods that can detect and analyze correlations of the structure of metallic nanoparticles (NPs) and their properties (e.g., catalytic activity).

This capability is a crucially needed step toward the goal of rational design of new catalysts. In particular, average coordination numbers (CNs), extracted from extended X-ray absorption fine structure (EXAFS) for NPs in the ca. 3 nm size range and smaller, are widely used to determine particle sizes, structural motifs, and shapes in well-defined NPs. For NPs with narrow size and shape distributions, such analysis was required to link their average shape with their catalytic activity and anomalous thermal properties and monitor in situ the NP coarsening.

In comparison to EXAFS, much less attention has been paid to the information encoded in X-ray absorption near-edge structure (XANES). The XANES portion of XAS spectrum is defined by electronic transitions to unoccupied atomic and hybridized (atom-ligand) states and is therefore sensitive to the details of 3D arrangements of atoms, providing sensitivity to structural and electronic characteristics. XANES also is relatively less affected by structural disorder, which severely reduces the quality of EXAFS data and complicates their interpretation, especially for nanomaterials, where disorder is much more pronounced than in their bulk counterparts, and also for in situ catalytic studies, which commonly involve high temperatures and hence result in strong thermal disorder. Finally, the better signal-to-noise ratio in XANES region in comparison with that in EXAFS region, allows studies of more diluted samples in complex, X-rays attenuating sample environments and on strongly absorbing support materials, and also the reduction of the data acquisition times. The main challenge that hinders the usage of XANES for the quantitative analysis of nanoparticles is the limited methodology available that would allow one to extract structural characteristics ("descriptors") from the spectra.

Embodiments of the invention address this challenge with supervised machine learning. Supervised machine learning (SML) methods are a tool for establishing relations between spectral features and relevant descriptors of the investigated sample. Embodiments of the invention employ an SML method, namely, artificial neural network (NN), to unearth information about the 3D structure of nanoparticles from experimental XANES. An immediate challenge in this approach (as in any SML application) is the requirement to have a large representative, labeled training data set with thousands of data points. Clearly, it would be impractical to attempt to construct such data set from experimental measurements. Embodiments of the invention overcome this data availability issue by constructing the training set via ab initio XANES simulations validated against experiment. By using theoretical simulations, we can generate a large number of spectra can be generated, corresponding to well-defined structure motifs.

Described below is the application of this method to the important problem of deciphering the 3D structure of supported platinum NPs. The approach described below uses average CNs for the first few coordination shells $\{C_1, C_2, C_3, \ldots\}$ that are known to characterize the size and 3D shape of a nanoparticle with close-packed or nearly close-packed structure. Next, a training data set is constructed using ab initio codes FEFF and FDMNES (these codes are used interchangeably by the XAS community). Theoretical XANES $\mu^i(E)$ are generated (here E is X-ray photon energy) for nanoparticles of different sizes/shapes, where the sets of corresponding average CNs are known. Artificial NN is then defined as a nonlinear function $h(\mu^i, \vec{\theta}), \rightarrow \{\tilde{C}_1, \tilde{C}_2, \tilde{C}_3, \ldots\}^i$ that uses as input a preprocessed and discretized XANES spectrum $u^i$ and returns a vector $\{\tilde{C}_1, \tilde{C}_2, \tilde{C}_3, \ldots\}^i$ As discussed below and illustrated in FIG. 8, function h can be represented as a network of nodes, where the values of the nodes in the first layer (input layer) are set by input vector $u^i$, whereas the value of jth node in kth layer $a_j^k$ is obtained as $a_j^k = f(\Sigma_m \theta_{j,m}^{k-1} a_m^{k-1})$. Here, summation is carried out over all nodes in the (k−1)th layer, f is so-called activation function (hyperbolic tangent in this case), $\theta_{j,m}^k$ are NN parameters, and $\{\tilde{C}_1, \tilde{C}_2, \tilde{C}_3, \ldots\}$ are obtained as the values of $a_j^k$ in the last (output) layer of NN. During the training process, the NN parameters $\theta_{j,m}^k$ are fit so that the distance between the true CNs vector $\{C_1, C_2, C_3, \ldots\}$ and NN output vector $\{\tilde{C}_1, \tilde{C}_2, \tilde{C}_3, \ldots\}$ is minimized for all spectra in the training set. After the optimal values of $a_j^k$ are found, NN can take experimental XANES as an input and determine $\{\tilde{C}_1, \tilde{C}_2, \tilde{C}_3, \ldots\}$ as estimators for average CNs for NPs in the corresponding sample. Knowing the CNs, one can then proceed to estimate the corresponding NPs size and shape, following the established prescription. For validation of the described approach, to avoid the averaging effects over a range of particle sizes/shapes, experimental data sets are obtained for Pt nanoparticles with narrow size and shape distributions, as validated by previously reported EXAFS and TEM measurements. The known results (NPs 3D geometry) can therefore be used for validating the quantitative capability of the approach. At the same time possible applications of the method are not limited to such monodisperse systems only. For heterogeneous samples, the method will yield ensemble-averaged CNs, and trends (rather than absolute values) in such averaged CNs can be used to monitor changes in particle shape and size.

FIG. 2 illustrates a method and system in accordance with an embodiment of the invention. Experimental data 21 are input into a neural network 22, and the neural network processes the data and outputs a sequence of Coordination Numbers 23. The coordination Numbers are used to estimate features of a 3D structure model 24.

Figure 3B:
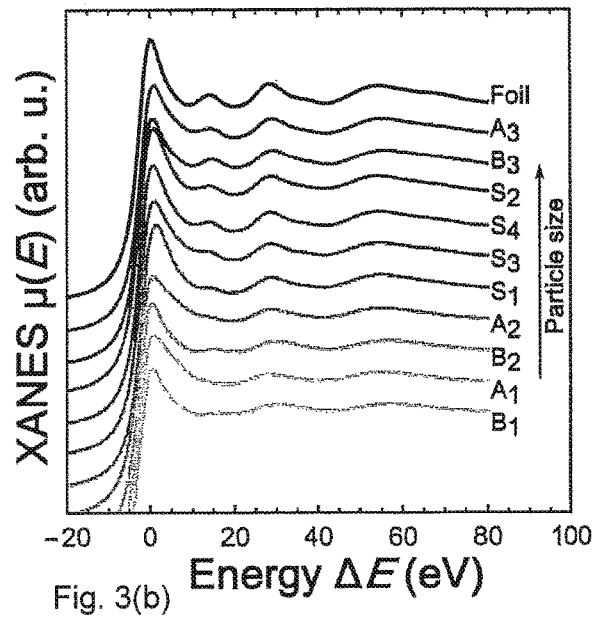
FIG. 3(b) shows experimental spectra for supported platinum nanoparticles with different sizes.
Figure 3C:
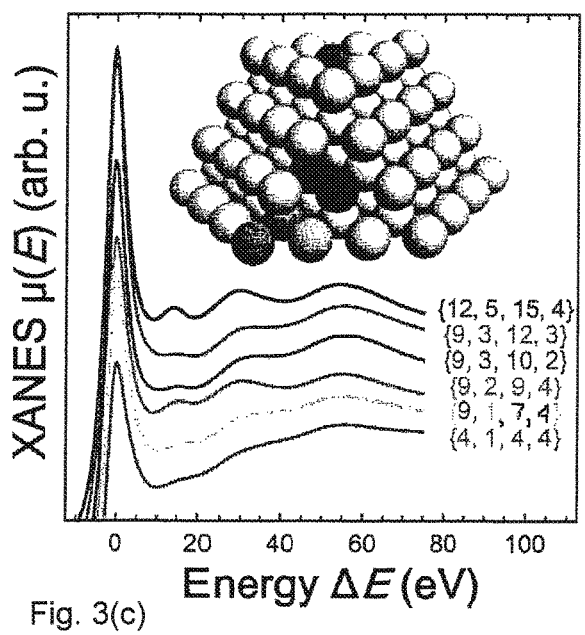
FIG. 3(c) shows site-specific XANES spectra calculated for sites with different first four Coordination Numbers in a platinum nanoparticle.
Figure 3D:
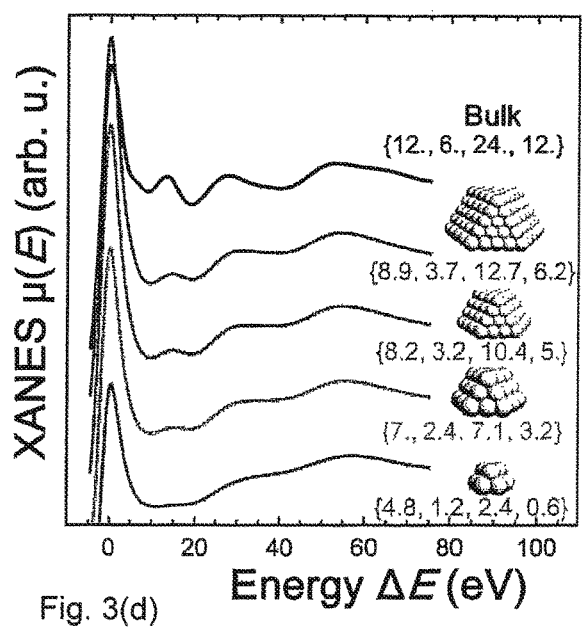
FIG. 3(d) illustrates particle-averaged Coordination Numbers and averaged XANES spectra, calculated for platinum nanoparticles of different sizes.

Sensitivity of XANES spectra to nanoparticle size and shape has been acknowledged theoretically previously, and such an effect could be also recognized in the experimental spectra discussed herein. FIGS. 3(a) and 3(b) show experimental Pt $L_3$-edge XANES spectra for Pt foil and Pt nanoparticles of different sizes on $\gamma$-$Al_2O_3$ support. FIGS. 3(a)-3(d) illustrate size effects in Pt $L_3$-edge XANES spectra. FIG. 3(a) shows experimental and theoretically calculated (with FEFF and FDMES codes) spectra for Pt foil. FIG. 3(b) shows experimental spectra for supported Pt NPs with different sizes, shifted vertically for clarity and ordered accordingly to average NPs size, as estimated form EXAFS and TEM analysis (particle size varies from ca. 0.9 to 2.9 nm). FIG. 3(c) shows site-specific XANES spectra (shifted vertically for clarity), calculated with FDMNES code for sites with different first four CNs in a Pt NP, shown in the inset. FIG. 3(d) shows particle-averaged CNs and averaged XANES spectra (shifted vertically for clarity), calculated with FDMNES code for Pt NPs of different sizes.

Pt NPs were prepared via inverse micelle encapsulation method (samples S1-S4) or by impregnation method (samples A1-A3), and XANES spectra were acquired at room temperature in a $H_2$/He atmosphere. In addition, XANES spectra for samples A1-A3 were also acquired in a pure He atmosphere. These spectra are denoted as B1-B3. Differences in size (from ca. 0.9 nm to ca. 2.9 nm) and shape of these NPs were established previously based on their TEM and EXAFS data. Details of sample preparation and experimental characterization are discussed below. XANES changes upon increase in NPs size can be clearly observed in FIG. 1(b). In particular, all XANES features are smoother and less pronounced for particles of smaller size.

This effect can be qualitatively reproduced by ab initio XANES simulations, which is an important first indication that on such simulations can be relied on to guide the analysis of NPs size and shape effect in experimental XANES data. FIG. 3(d) shows a comparison of XANES spectral calculated with FDMNES code for Pt NPs of the same shape but different sizes. Note that the total XANES $\mu(E)$ of a nanoparticle is an average of partial contributions $\mu_j(E)$ from all $N_a$ atoms in the nanoparticle: $\mu(E)=\Sigma_j \mu_j(E)/N_a$. Therefore, in the simulations, independent XANES calculations were first carried out for all NP sites and then averaged. Such site-specific XANES spectra are shown in FIG. 3(c). As FIG. 3(c) shows, spectra for different sites differ significantly. Spectra for sites located deep in the NP core resemble those for bulk Pt material, whereas spectra for undercoordinated surface sites have significantly smoother features. The previously observed size sensitivity of particle-averaged XANES (FIG. 3(d)) thus can be interpreted as a result of changes in the ratio of core sites and surface sites.

Each site can be conveniently characterized by site-specific CNs $\{c_1, c_2, c_3, \ldots\}$, that is, the total numbers of neighboring atoms in the first, second, third, and so on coordination shells of a particular site. Importantly, as shown in FIG. 3(c), the differences in the number of nearest neighbors only ($c_1$) cannot account for all of observed differences in site-specific spectra because the spectra for two nonequivalent sites with the same number of nearest neighbors are clearly different. This demonstrates the sensitivity of XANES to the arrangements of more distant neighbors. The weights of different nonequivalent site-specific contributions to the total XANES are directly proportional to the ratios of nonequivalent sites and are related to the average CNs $\{C_1, C_2, C_3, \ldots\} = \Sigma_j \{c_1, c_2, c_3, \ldots\}_j/N_a$. Knowing the ratios of nonequivalent sites (or, alternatively, the set of average CNs), the 3D shape of the nanoparticle can in principle be reconstructed.

Extraction of this structural information from the particle-averaged XANES data is, however, challenging because, first, many such nonequivalent sites are present in nanoparticles, and the contrast between their partial contributions to the total spectrum is weak. Second, whereas ab initio simulations (which could be used to assign partial XANES contributions to specific NP sites) provide qualitative agreement with the experimental data, significant systematic errors of XANES modeling, as demonstrated in FIG. 3(a) for Pt foil, prohibit in most cases the direct fitting via, for example, the least-squares procedure that has been used for simple systems. In particular, note that the systematic error of Pt $L_3$-edge XANES modeling is comparable to the amplitude of broad XANES features for surface sites. Thus the contribution of surface sites cannot be analyzed reliably by linear methods. The direct fitting of each experimental XANES spectrum would also be challenging due to high computational costs of ab initio XANES modeling (calculations of a XANES spectrum for a nanoparticle with a few hundreds of atoms may take several CPU hours).

The use of SML methods allows us to solve these problems. Such methods as artificial neural network approach can find complex, nonlinear relationships between features in XANES data and structure descriptors. The NN method can identify the spectral regions, relevant for structure determination, based on the information automatically extracted from the training on a vast number of training spectra, thus minimizing the influence of systematic errors.

To establish relations between the features in averaged XANES $\mu(E)$ and average CNs $\{C_1, C_2, C_3, \ldots\}$, artificial NN is trained with theoretical XANES data, calculated with FEFF and FDMNES codes for Pt particles of different sizes and shapes, shown in FIGS. 7(a) and 7(b) discussed below. The pairs of theoretical spectra $\mu^i(E)$ and average CN sets $\{C_1, C_2, C_3, \ldots\}^i$ then can be used to fit the NN parameters $\theta_{j,m}^k$. Here and further below, the discussion is limited to the analysis of the first four coordination shells only because the first four CNs are sufficient to represent the 3D shape and size of Pt nanoparticles and because atoms belonging to the first four coordination shells can be identified unambiguously not only in face-centered cubic (fcc)-type structures but also for icosahedral and hexagonal close-packed (hcp) structures, which were also used for NN training. Details of the NN implementation and NN training are discussed below. Note that the ab initio XANES calculations to construct the training data set were the most time-consuming part of the procedure and required several CPU days. Training of NN was accomplished in less than one hour on a single CPU. For a given system, both of these steps need to be performed only once. After the training is completed, NN can be used to analyze quickly an unlimited number of theoretical and experimental XANES spectra (the processing of each spectrum takes less than a second).

To validate the method, theoretical XANES spectra calculated for Pt NPs of different sizes and shapes with FEFF and FDMNES codes were provided as input for the trained NN with fixed parameters $\theta_{j,m}^k$. The aim is to verify that the CNs $\{\tilde{C}_1, \tilde{C}_2, \tilde{C}_3, \tilde{C}_4\}$ predicted by NN, indeed are close to the true CN values $\{C_1, C_2, C_3, C_4\}$.

Figure 4A:
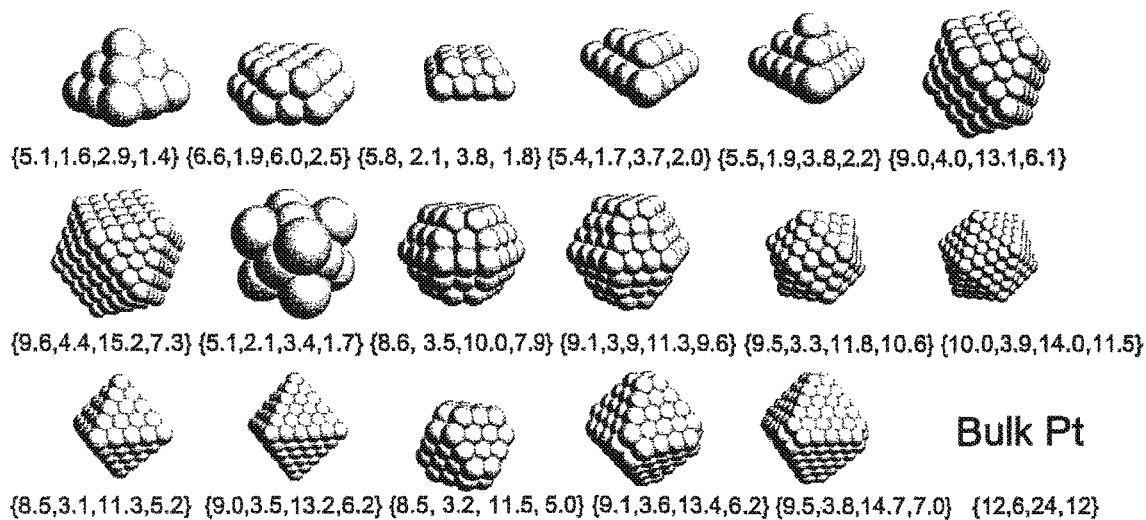
FIG. 4(a) shows platinum nanoparticles models used to validate the accuracy of a trained Neural Network in an embodiment of the invention.
Figure 4B:
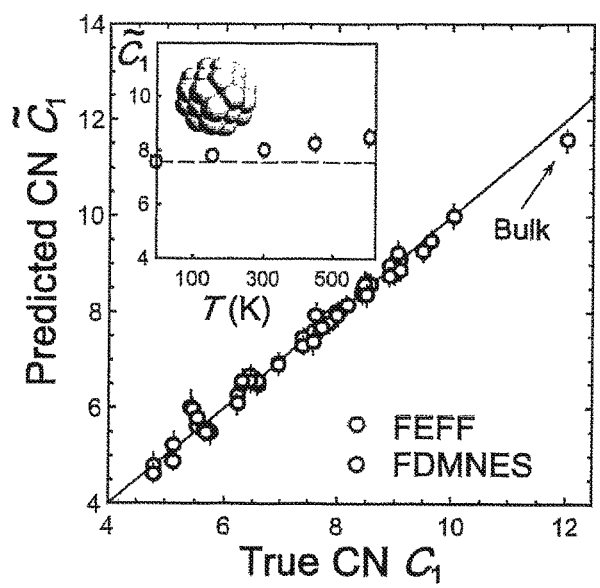
FIG. 4(b) compares Coordination Numbers predicted with the Neural Network, in an embodiment of the invention, with true Coordination Numbers, for the first coordination shell.
Figure 4C:
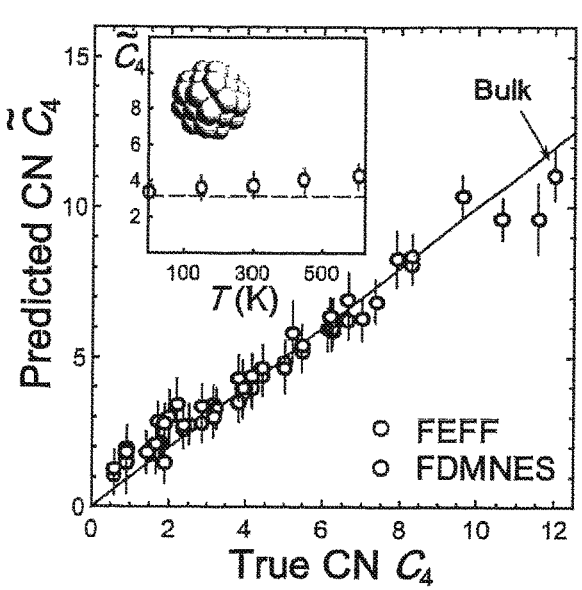
FIG. 4(c) compares Coordination Numbers predicted with the Neural Network, in an embodiment of the invention, with true Coordination Numbers, for the fourth coordination shell.

FIGS. 4(a)-4(d) illustrate validation of neural network using theoretical XANES data. FIG. 4(a) shows additional Pt NPs models, used to validate the accuracy of trained NN. In FIGS. 4(b) and 4(c), true CNs for particles, are shown in panel a and FIG. 7(a), discussed below, are compared with the CNs predicted by NN from SANES data, generated by FEFF or FDMNES codes. Solid lines are guides for eye. The insets show CNs, predicted by NN for truncated octahedral particle with 38 atoms from FEFF-generated XANES data, where thermal disorder was introduced using Debye model in the temperature range between 0 and 600 K. Debye temperature was set to bulk Pt value 244 K. Horizontal dashes lines show the true value of corresponding CN.

For validation, particle-averaged XANES data were used for particles that were used to construct training data set (Figure S2a) as well as for particles of other shapes and sizes (FIG. 7(a) discussed below) as well as for particles of other shapes and sizes (FIG. 4(a)) with fcc-type structure, truncated by (100) and (111) planes, and also with icosahedral and hcp structures. The predicted and true first-shell and fourth-shell CNs for different NPs are compared in FIGS. 4(b) and 4(c). Corresponding comparison for the second and third coordination shells is shown in FIG. 8(a) discussed below. In most cases, the predicted CNs for all four coordination shells agree within error bars with the true values.

Special attention was paid to disorder effects. It was demonstrated both experimentally and theoretically that atomic thermal motion results in small but detectable changes in XANES features. Static disorder due to, for example, surface-induced stress in the material is also expected to have similar effect on XANES spectra. Note that the NN training was performed using XANES data for NPs models without any disorder in atomic positions. Therefore, to check how robust the analysis is with respect to the possible artifacts caused by disorder effects, an additional validation of the method was performed, providing FEFF-generated XANES spectra where thermal disorder was introduced via commonly used correlated Debye model as input for the NN. The predicted CNs as a function of temperature are also shown in FIGS. 4(b) and 4(c) and in FIG. 8(a). As these Figures show, the predicted CN values remain relatively stable in a broad range of temperatures (the changes in the predicted CNs values are comparable to the error bar of the analysis).

Next, the NN was applied to determine the CNs corresponding to experimental XANES for Pt NPs on $\gamma$-$Al_2O_3$ and experimental Pt foil data. Obtained results for the first and fourth coordination shells are shown in FIGS. 5(a) and 5(b), while those for the second and third coordination shells are in FIG. 9(a) discussed below.

Figure 5A:
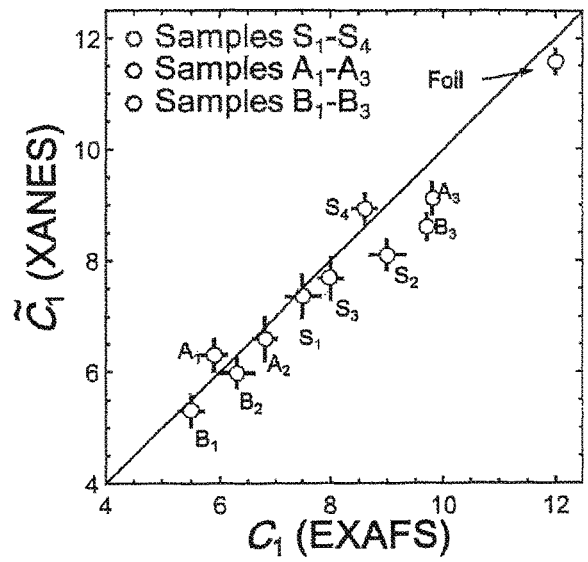
FIG. 5(a) shows a comparison of the first-shell Coordination Numbers, as predicted by the Neural Network in an embodiment of the invention, and results of conventional EXAFS analysis for platinum nanoparticles of $\gamma$-$Al_2O_3$.
Figure 5B:
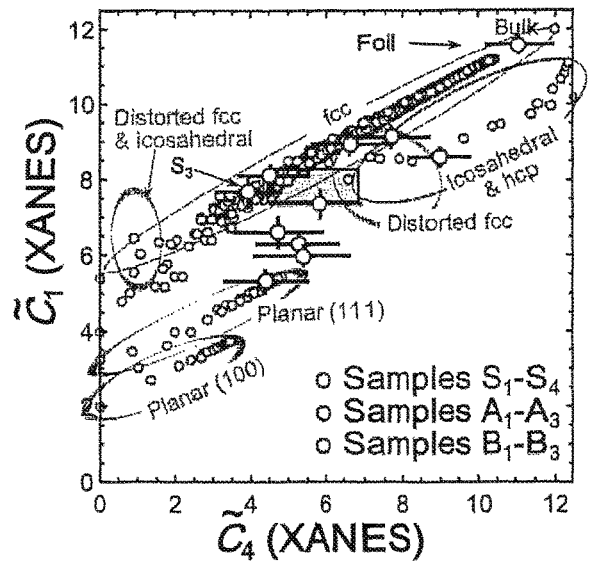
FIG. 5(b) depicts Coordination Numbers predicted by the Neural Network in an embodiment of the invention, for the fourth coordination shell.
Figure 5C:
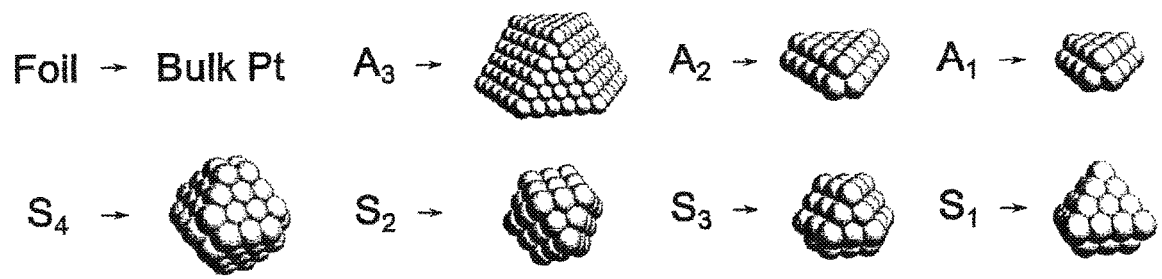
FIG. 5(c) shows possible 3D models of particles corresponding to samples $A_1$-$A_3$ and $S_1$—$S_4$.

FIGS. 5(a) and 5(b) show Coordination Numbers predicted by NN from experimental XANES. FIG. 5(a) shows a comparison of the first-shell CNs, as predicted by NN method, and results of conventional EXAFS analysis for Pt NPs on $\gamma$-$Al_2O_3$, solid line is guide for eyes. FIG. 5(b) shows CNs predicted by NN method for the fourth coordination shell. Empty circles correspond to CNs for Pt model clusters with different sizes and shapes, obtained from fcc-type Pt structure, truncated alone (100) or (111) planes, as well as for clusters with icosahedral and hcp-type structures. Rectangle in FIG. 5(b) shows the confidence region for CNs, obtained for sample S3 from an MS-EXAFS analysis. FIG. 5(c) shows corresponding possible 3D models of particles.

As an important cross-check, note that the first-shell CNs determined for all samples are in an excellent agreement with the results of EXAFS analysis (FIG. 5(a)). Also, a systematic increase in CNs can be observed with the increase in NP size, as estimated by TEM (Table 1).

TABLE 1

Coordination Numbers, Predicted by NN from Experimental XANES for Pt Foil and Supported Pt NPs in a $H_2$/He Atmosphere

| Sample | $\tilde{C}_1$ | $\tilde{C}_2$ | $\tilde{C}_3$ | $\tilde{C}_4$ | $d_{TEM}$ (nm)[a,b] | Model NP $CN_s$[c] | Model NP size (nm)[c] |
|---|---|---|---|---|---|---|---|
| foil | 11.6(2) | 5.8(2) | 23(1) | 11.1(8) |  | {12, 6, 24, 12} | ∞ |
| $A_3$ | 9.1(3) | 4.3(3) | 11(2) | 8(1) | 3(1) | {9.4, 4.0, 14.4, 7.1} | 2.8 |
| $S_4$ | 8.9(3) | 4.2(4) | 10(2) | 7(1) | 1.2(2) | {8.5, 3.2, 11.5, 5.0} | 1.2 |
| $S_2$ | 8.1(3) | 3.7(4) | 8(2) | 4.5(8) | 1.2(3) | {7.8, 3.3, 9.6, 4.1} | 1.1 |
| $S_3$ | 7.7(4) | 3.8(4) | 4(2) | 3.9(9) | 0.9(2) | {7.7, 3.1, 9.2, 3.8} | 1.1 |
| $S_1$ | 7.4(4) | 2.0(3) | 3(1) | 6(1) | 1.1(2) | {7.4, 2.6, 8.0, 3.3} | 1.2 |
| $A_2$ | 6.6(4) | 2.3(4) | 3(1) | 5(1) | 1.1(3) | {6.6, 2.1, 6.0, 2.9} | 1.4 |
| $A_1$ | 6.3(3) | 1.5(3) | 2(1) | 5(1) | 0.9(2) | {6.2, 1.9, 5.1, 2.4} | 1.1 |

[a]In the parentheses the uncertainty of the last digit is given.
[b]Size of Pt NPs, determined by TEM.
[c]Coordination number and size of possible structure models, shown in FIG. 3c.

These findings demonstrate the validity of the NN-XANES method for the analysis of experimental data and that systematic differences between experimental and theoretical data used for NN training do not affect the performance of the method significantly.

Figure 9A:
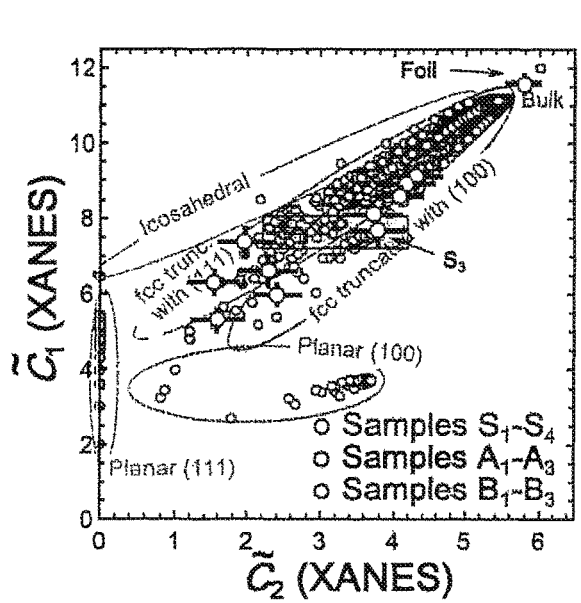
FIG. 9(a) shows Coordination Numbers for the first and second Coordination Shells, predicted by the Neural Network, in an embodiment of the invention, from experimental XANES.
Figure 9B:
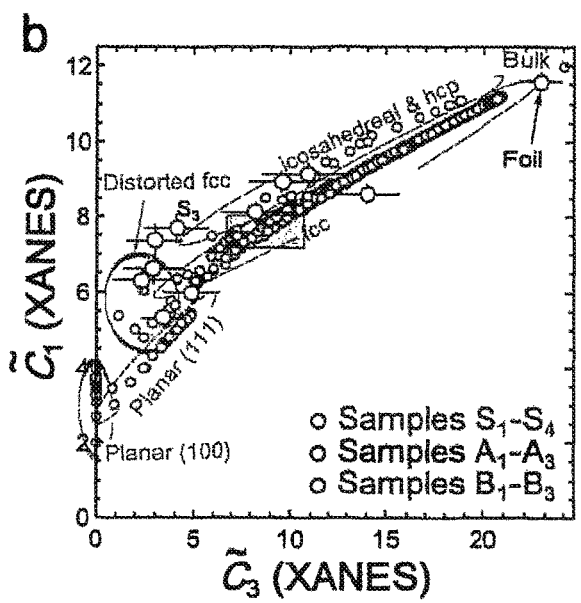
FIG. 9(b) shows Coordination Numbers for the first and third Coordination Shells, predicted by the Neural Network, in an embodiment of the invention, from experimental XANES.

Analysis of CNs for more distant coordination shells using EXAFS method is much less straightforward and less reliable due to a large number of structure parameters and multiple-scattering (MS) effects that need to be accounted for in the analysis. Nevertheless, FIG. 5(b) and FIGS. 9(a) and 9(b) show the results of such analysis, performed in Roldan Cuenya, B.; Frenkel, A.; Mostafa, S.; Behafarid, F.; Croy, J.; Ono, L.; Wang, Q. Anomalous lattice dynamics and thermal properties of supported size- and shape-selected Pt nanoparticles. Phys. Rev. B 2010, 82, 155450 (Roldan Cuenya, et al.), for sample $S_3$. CNs, predicted by NN, agree with the results of such MS-EXAFS analysis for the second and fourth coordination shells and are slightly smaller than the result from MS-EXAFS analysis for the third coordination shell.

Another indicator of the validity of the NN-XANES method disclosed herein is that for all samples, physically reasonable sets of CNs were obtained. Note, as shown in FIG. 5(b) and FIGS. 9(a) and 9(b), that CNs for different coordination shells are strongly correlated, and in a realistic cluster model one cannot expect to have, for example, very large CN for the fourth coordination shell while having small first-shell CN. The results yielded by the NN from experimental XANES data agree with this observation1 and in almost all cases the obtained CNs agree reasonably with what could be expected for close-packed metallic particles with fcc-type structure.

When NN-XANES results for particles in $H_2$/He (spectra $A_1$-$A_3$ and pure He atmospheres (spectra $B_1$-$B_3$) are compared, slightly different CNs can be observed (see FIGS. 5(a) and 5(b)), suggesting changes in particle local structure. Whereas XANES data for samples in $H_2$/He suggested a well-ordered fcc-type structure, more distorted structure models give better agreement with the obtained CNs for samples in a He atmosphere. This agrees with the observation that Pt interactions with hydrogen relieve the surface-induced strain in Pt NPs and result in more ordered particle structures. This result demonstrates a utility of the method disclosed herein for the in situ studies of NPs shape and size changes in response to changes in ambient conditions.

For samples in $H_2$/He, the CNs, predicted by the NN from experimental XANES, and information on NP size from TEM, were used to propose a possible shape for investigated NPs (Table 1 and FIG. 5(c)). Specifically, structure models were selected, whose first-shell CN within error bar agrees with the results of NN-XANES analysis and whose size within error bar agrees with TEM results; from this set models were selected, whose second-, third-, and fourth-shell CNs are as close as possible to the results from NN-XANES analysis. This analysis relied on the a priori TEM observation that the NP size and shape distribution in all of these samples is narrow. Note that the influence of NP size distribution on CNs, derived from EXAFS analysis, is discussed in Frenkel, A. I.; Yevick, A.; Cooper, C.; Vasic, R. Modeling the structure and composition of nanoparticles by extended X-ray absorption fine-structure spectroscopy. *Annu. Rev. Anal. Chem.* 2011, 4, 23-39, where it was demonstrated that broad size distribution may result in CN overestimation. The analysis of CNs in this case will yield an effective (median) shape of the cluster. The same arguments are also applicable for XANES analysis results. Note also that, for each sample at least several similar NPs models can be found (see FIG. 10, discussed below), which all agree reasonably with the predictions of NN-XANES method. The larger the particle, the larger the number of different structure models that fit the obtained CNs. As with any other XAS method, also for the NN/XANES approach disclosed herein, all particles with sizes larger than ca. 5 nm will be indistinguishable from bulk material because the fraction of undercoordinated surface sites gets negligible, and the spectra for sites in the NPs core are close to XANES of bulk metal. Therefore, the NP structure models, shown in FIG. 5(c), should be considered only as representative examples of possible structures. Nevertheless, one can note that the shapes, predicted here by the NN-XANES method disclosed herein, are in agreement with the shapes, proposed from advanced MS-EXAFS and TEM size analysis.

Figure 11A:
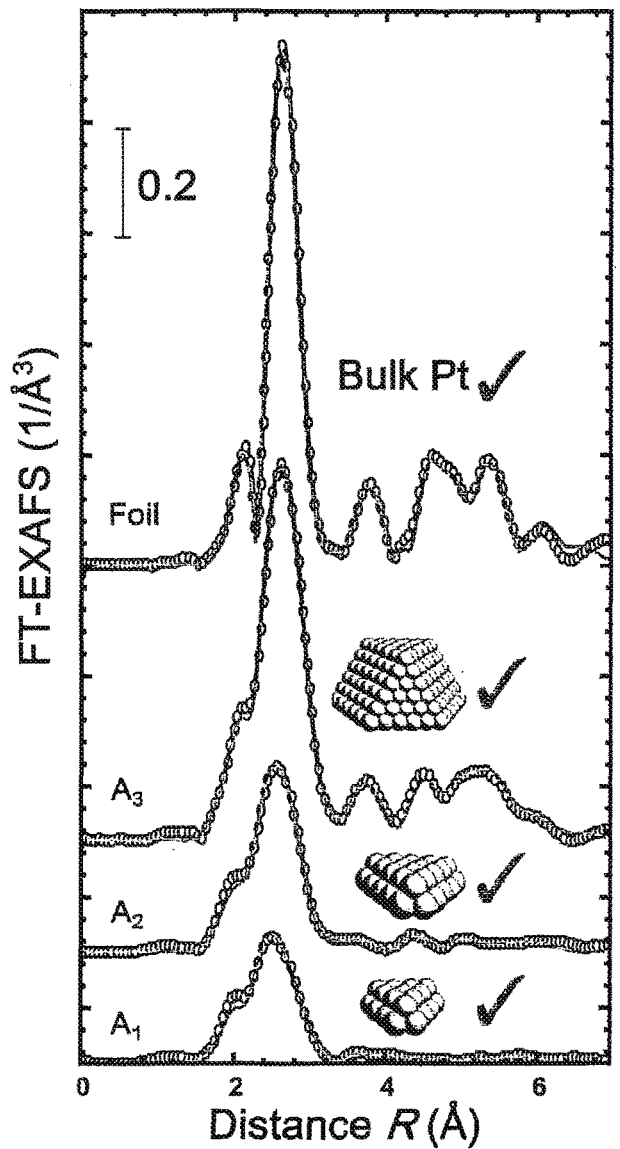
FIG. 11(a) demonstrates results of \EXAFS simulations for structure models constructed based on the analysis of XANES data with Neural Network method, in an embodiment of the invention, for platinum foil and three samples, $A_1$-$A_3$.
Figure 11B:
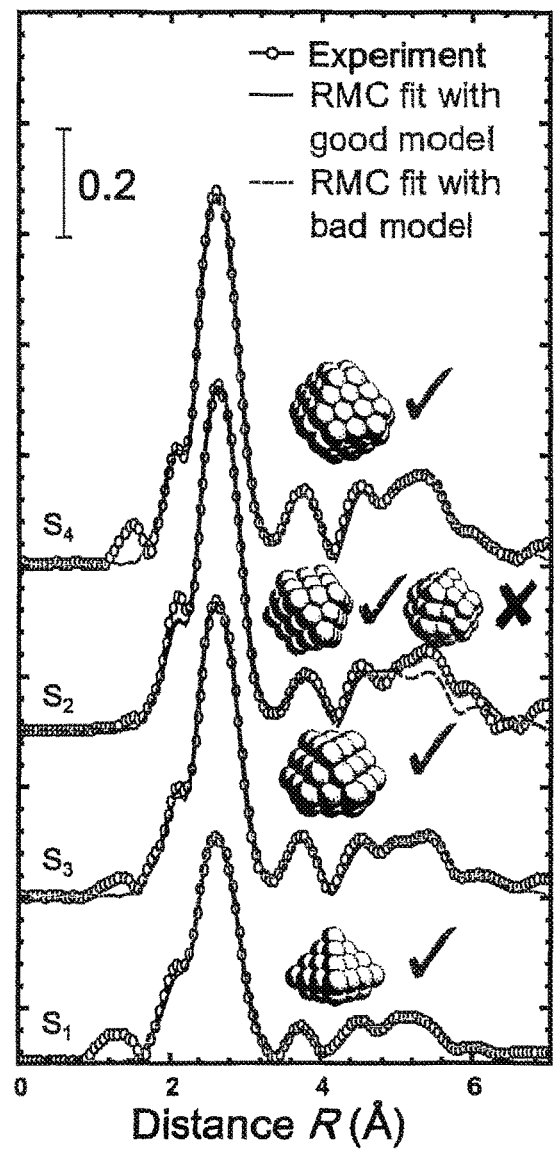
FIG. 11(b) demonstrates results of EXAFS simulations for structure models constructed based on the analysis of XANES data with Neural Network method, in an embodiment of the invention, for four additional samples, $S_1$-$S_4$.

As an independent reality check, the so-obtained, representative NPs shapes were validated with reverse Monte Carlo (RMC) simulations of EXAFS data. In RMC-EXAFS analysis the structure models that were established based on the NN-XANES method were used to calculate the corresponding theoretical EXAFS spectra, allowing small deviations from the initial structure to account for the disorder effects. FIGS. 11(a) and 11(b), discussed below, demonstrate that RMC-EXAFS simulations for all structure models yielded by NN-XANES method confirm their agreement with the available EXAFS data. More details of the RMC-EXAFS method are given below.

Overall, the NN-XANES analysis shows that whereas the inverse micelle encapsulation method results in more spherical, symmetric particles, the particles prepared via impregnation method have flat, raft-like shapes. In both cases, smaller particles have more flattened shapes due to a strong interaction of Pt atoms with the support. This finding demonstrates the utility of the method disclosed herein for determination of catalyst morphology and enables, for example, direct correlation of NP shape with its catalytic properties. The determination of particle shape, as developed herein on the basis of XANES data, relies on the use of samples with narrow particle size and shape distributions (the same requirement as for the use of EXAFS modeling methods developed previously for the same purpose), as validated, for example, by TEM imaging. Note, however, that also in the cases when the particle size and shape distribution is not narrow, the ability provided by the method disclosed herein to obtain ensemble average (effective) CNs and to monitor in situ the changes in such effective CNs can significantly advance the understanding of particle formation, coarsening, and agglomeration processes, despite the fact that in this case the absolute CN values will be somewhat overestimated. For example, increase in all CNs can be unambiguously interpreted as evidence of NP growth. Similarly, increase in some CNs while others are decreasing indicates changes in NP shape. Also, as discussed above, after NN training is complete for a specific chemical element, the so obtained NN can be used as a static analysis tool to quickly find corresponding structures for an unlimited number of experimental XANES spectra in nanoparticles consisting of those atomic species. Furthermore, such analysis can be even done on-the-fly during the data acquisition, which is a unique capability for in situ studies. The ability of the method disclosed herein to analyze quickly a large number of XANES spectra makes it also attractive for high-throughput studies, which are getting progressively more widespread with the development of the new generation of X-ray sources that provide unprecedented photon flux and dramatically reduce the spectra acquisition time.

Embodiments of the invention provide a number of significant advantages. For instance, using a sample set of well-defined metal nanoparticles with size and shape control as an example, embodiments of the invention demonstrate that XANES spectra in nanostructures can be translated into real-space information about the coordination environment of metal atoms. Only by using neural networks was it possible to extend the sensitivity of this technique to the fourth coordination shell and thus to enable the determination of particle sizes and shapes. Unlike MS-EXAFS or RMC-EXAFS methods, the XANES-based approach disclosed herein does not require high-quality EXAFS data and thus makes possible advanced analysis of NPs structure at high temperatures, with diluted samples on X-rays absorbing supports and in complex sample environments. Whereas, embodiments of the invention discussed above focus on the study of metal nanoparticles, embodiments of the invention can be readily extended to other nanoscale systems. In addition, embodiments of the invention may be especially beneficial to analyze the in situ changes in the environments of metal atoms in a wide range of catalytically relevant systems and processes.

Figure 6:
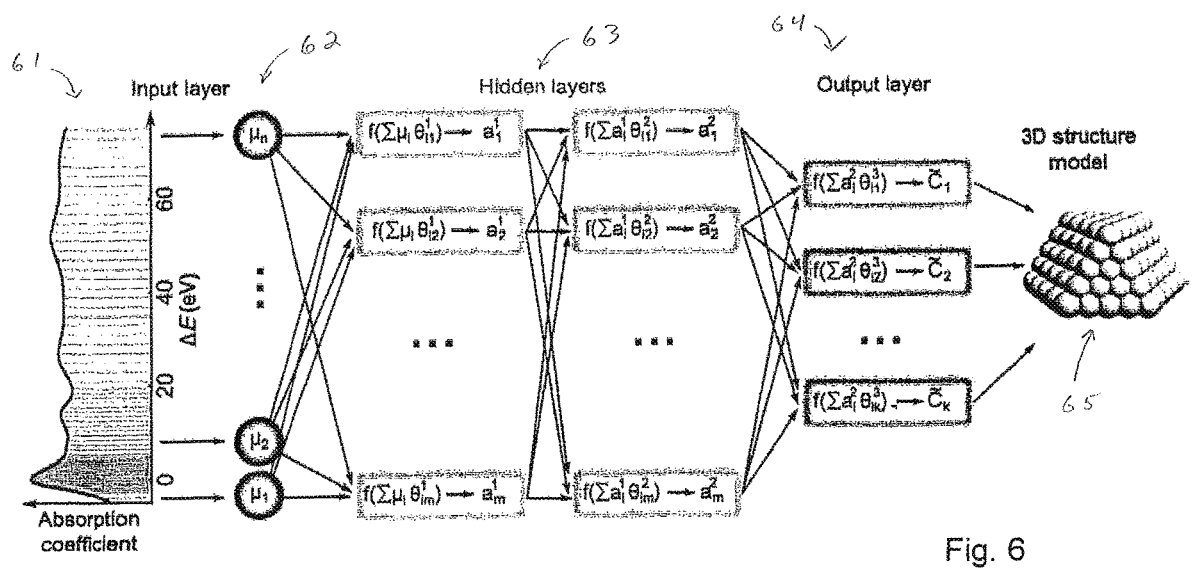
FIG. 6 is a more detailed schematic representation of artificial neural network-based method for prediction of nanoparticle size and shape.

FIG. 6 is a schematic representation of artificial neural network-based method for prediction of nanoparticle size and shape. Preprocessed XANES spectrum for a nanoparticle is discretized and used, at 61, to set the values of neural network (NN) nodes in the input layer 62. The input is then processed in the NN hidden layers 63. Each hidden node represents a function, which adds together the node inputs, weighted with weights θ, applies to the sum the activation function f, and returns the result as a real number a to be used by NN nodes in the subsequent layers. Hidden layers map the input to the output 64—set of predicted average coordination numbers. Average coordination numbers are then used to determine the size and shape of the nanoparticle 65.

Sample Preparation and Experimental Characterization

Experimental X-ray absorption spectroscopy (XAS) data for Pt nanoparticles (NPs) of different sizes and shapes supported on $\gamma$-$Al_2O_3$ were taken from Roldan Cuenya, B.; Frenkel, A.; Mostafa, S.; Behafarid, F.; Croy, J.; Ono, L.; Wang, Q. Anomalous lattice dynamics and thermal properties of supported size- and shape-selected Pt nanoparticles. *Phys. Rev. B* 2010, 82, 155450 (Roldan Cuenya, et al.); and Sanchez, S. I.; Menard, L. D.; Bram, A.; Kang, J. H.; Small, M. w.; Nuzzo, R. G.; Frenkel, A. I. The emergence of nonbulk properties in supported metal clusters: negative thermal expansion and atomic disorder in Pt nanoclusters supported on γ-$Al_2O_3$. *J. Am. Chem. Soc.* 2009, 131, 7040-7054 (Sanchez et al.). Pt NPs were prepared via inverse micelle encapsulation method or by the incipient wetness method. Narrow NPs size and shape distributions were confirmed with TEM, as explained in Roldan Cuenya B. et al. and Sanchez, S. I. et al. XAS measurements were performed at National Synchrotron Light Source, Brookhaven National Laboratory, and Advanced Photon Source, Argonne National Laboratory. All XAS measurements were performed in He or $H_2$/He atmosphere at room temperature in transmission mode. Conventional analysis of EXAFS data for investigated samples was presented in Roldan Cuenya B. R. et al. and Sanchez, S. I. et al., infra.

Ab Initio Calculations of XANES Spectra

Pt $L_3$-edge XANES simulations were performed with two different codes: FEFF and FDMNES. Parameters for ab initio XANES simulations were chosen to ensure as good as possible agreements with experimental Pt foil XANES data.

FEFF version 9.6.4 was used for self-consistent calculations within full multiple scattering (FMS) approach and muffin-tin (MT) approximation. FMS clusters size was chosen at a large enough value so that the whole cluster is included in the FMS calculations. Default value for MT radius (1.5 Å) for Pt atoms was used. Complex exchange-correlation Hedin-Lundqvist potential was used. To model core-hole, random phase approximation (RPA) was used. No broadening, except due to the core-hole, was included in XANES calculations.

For FDMNES calculations, FDMNES II program, revision $9^{th}$, was used. Similarly as for FEFF calculations, FMS and MT approximations were relied on, since the finite-difference method, also implemented in FMDNES, did not result in a significantly better agreement with experimental data in this case, and was more computationally expensive. Real Hedin-Lundqvist exchange-correlation potential, and no core hole approximation were used for FDMNES simulations.

Regular Pt NPs structure models with fcc-type structure and with octahedral, truncated octahedral, cuboctahedral and cubic shapes were constructed by cutting with (100) and (111) planes fcc-type Pt lattice with lattice constant $a_0$=3.924 Å. These regular structures were further truncated with an additional (100) or (111) plane to model the interface with substrate. Regular icosahedral and hcp-type clusters were constructed using cluster coordinates generator from Glasner, D.; Frenkel, A. I.; Hedman, B.; Pianetta, P. Geometrical characteristics of regular polyhedral: application to EXAFS studies of nanoclusters. *AIP Conf. Proc.* 2007, 882, 746-748, maintaining the same nearest-neighbor distance 2.775 Å as in fcc-type clusters.

These cluster models were used for XANES simulations. Both for FDMNES and FEFF calculations, site-specific XANES calculations for all non-equivalent sites in cluster models were performed. The total XANES spectrum was obtained as an average of site-specific spectra. The calculated absorption spectra were shifted in energy by ΔE to align the energy scale used in theoretical calculations with the energy scale of experimental data. The values of ΔE for FEFF and FDMNES spectra were chosen as the ones that gave the best agreement between experimental and calculated Pt $L_3$-edge XANES for Pt foil, and were fixed for all further calculations. After the alignment, the theoretical and experimental spectra were re-interpolated on a non-uniform grid that spanned energies from $E_{min}$=11561.5 eV to $E_{max}$=11641.0 eV, with the step size of 0.2 eV for data points near absorption edge, which gradually increased up to 1.0 eV for points at $E=E_{max}$.

Supervised Machine Learning Implementation and Training

In this study for analysis of XANES spectra, regression was used with an off-the-shelf implementation of artificial neural network, provided by Wolfram Mathematica software (version 10). SML hyperparameters (number of NN nodes, number of training examples, etc.) were optimized to ensure optimal performance on validation data set (theoretical XANES data for NPs with different sizes and shapes). Good results can be obtained with artificial neural network with 129 nodes (corresponding to the number of data points in the XANES spectra) in the input layer and two hidden layers with 339-387 nodes in each. Hyperbolic tangent function was used as an activation function, and default values for the regularization coefficients were used.

To establish relation between the features in averaged XANES (μE) and average coordination numbers $\{C_{1,2}, C_3, \ldots\}$, artificial NN was trained with theoretical XANES data, calculated with FEFF and FDMNES codes for Pt particles of different sizes and shapes. Considering that XANES calculations for each particle may require several CPU hours, it is impractical to use directly for NN training particle-averaged XANES data that correspond to specific particles. Note also that the difference between most of the particle-averaged coordination numbers (CNs), and, hence, also particle-averaged XANES spectra is small, especially for bigger particles. Therefore, to prevent NN overfitting, very large data set of particle-averaged spectra would be required. On the other hand, the sets of average coordination numbers $\{C_{1,2}, C_3, \ldots\}$ do not necessarily need to correspond to any realistic particle model during the training. Therefore, for NN training, an artificial dataset was used, created from site-specific theoretical XANES spectra for a small ensemble of 18 particles of different sizes and shapes with a total of 218 non-equivalent Pt sites as shown in FIG. 7(a). For each of the sites, both FEFF and FDMNES calculations were performed, resulting in 436 site-specific spectra. Sets of site-specific coordination numbers $\{c_{1,2}, c_3, \ldots\}$ for each of those sites are known. To construct one training example, n of these sites were randomly picked, and corresponding average spectrum were created as $\mu^i(E) = \Sigma_{j=1}^{n}\mu_j(E)/n$, where $\mu_j(E)$ are site-specific spectra calculated either with FEFF or FDMNES for j-th of the randomly chosen sites. The corresponding average CNs set can be obtained as $\{C_{1,2}, C_3, \ldots\}^i = \Sigma_{j=1}^{n}\{C_1, C_2, C_3, \ldots\}_j/n$. Note that the selected n sites do not need to correspond to the same NP. This process was repeated $N_t$ times to generate as many new training examples as required. Clearly, such approach allows an almost unlimited number of training examples to be obtained quickly, and requires much less computational efforts than the direct usage of particle-averaged XANES data for NN training. Such approach may also allow one to explore the configurational space much more efficiently than when particle-averaged XANES data are used for NN training, and allows good performance to be achieved with fewer number of training examples. For purposes of this approach, a good performance of NN can be achieved with n=3 and $N_t$ in the range between 200,000 and 600,000.

Importantly, unlike it was for NN training, for the validation of the NN, particle-averaged XANES spectra were used, corresponding to Pt NPs of specific size and geometry. For validation, structure models were used that were indirectly used for generation of training data set (FIG. 7(a)), as well as particles of different sizes and shapes (FIG. 4(a)). Good accuracy yielded by the NN in the determination of CNs for such validation dataset proves the validity of the training approach.

In addition, the systematic errors of NN predictions can be reduced significantly, if instead of using XANES spectra $\mu(E)$ directly as input for NN, $\Delta\mu(E)=\mu(E)-\mu_{bulk}(E)$, is provided, where $\mu_{bulk}$ is XANES spectrum for bulk material. The bulk data is subtracted both from the spectra used for NN training as well as from the spectra that are later analyzed with the trained NN. For theoretical spectra calculated with FDMNES and FEFF, $\mu_{bulk}(E)$ is obtained in, correspondingly, FDMNES and FEFF calculations for bulk Pt. For experimental XANES spectra, as $\mu_{bulk}$, experimental XANES spectrum for Pt foil was used. A small subset of $\Delta\mu^i(E)$ spectra, used for NN training, is shown in FIG. 7(b) along with the corresponding average CNs $\{C_1, C_2, C_3, C_4\}^i$.

Four separate neural networks were used to predict the 1st, 2nd, 3rd and 4th coordination numbers. These four NNs were completely independent, except that they were trained on the same sets of training data. 200,000-600,000 training examples were used for training. The NNs training was repeated several (five) times with different sets of training examples and different numbers of hidden nodes to estimate the uncertainties of predicted coordination numbers. The coordination numbers, reported here and above, correspond to average prediction of all five neural networks.

Other supervised machine learning (SML) approaches were tried, as supported vector regression, ridge regression and artificial neural networks with different architectures as implemented in TensorFlow package. All four CNs were predicted simultaneously in these cases within one SML routine. All these methods yielded results comparable with the ones obtained with neural networks, implemented in Mathematica.

Reasonable results can be obtained using even the simplest SML method-multiple linear regression. The accuracy of CNs prediction for validation data set, as demonstrated by linear regression method implemented in Mathematica, is just slightly worse than that for NN method. Training data sets of the same size were used to train both NN and linear regression routines. The advantage of NN can be demonstrated by comparing root-mean square errors (RMSE), yielded by NN (0.7, 0.5, 2.1, 2.2 for the 1st, 2nd, 3rd and 4th CNs, respectively) and linear regression method (0.8, 1.0, 5.3, 4.1, respectively). Better performance of NN is a result of enhanced sensitivity to the non-linear relations between features in XANES spectra and coordination numbers, ensured by nodes in the hidden layers of NN that are not present in linear regression method.

Figure 7A:
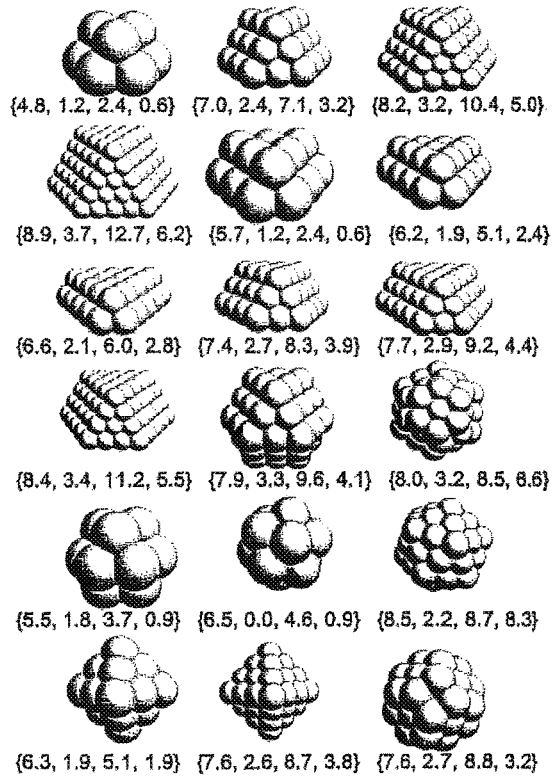
FIG. 7(a) illustrates cluster models of platinum nanoparticles used to construct training data sets.
Figure 7B:
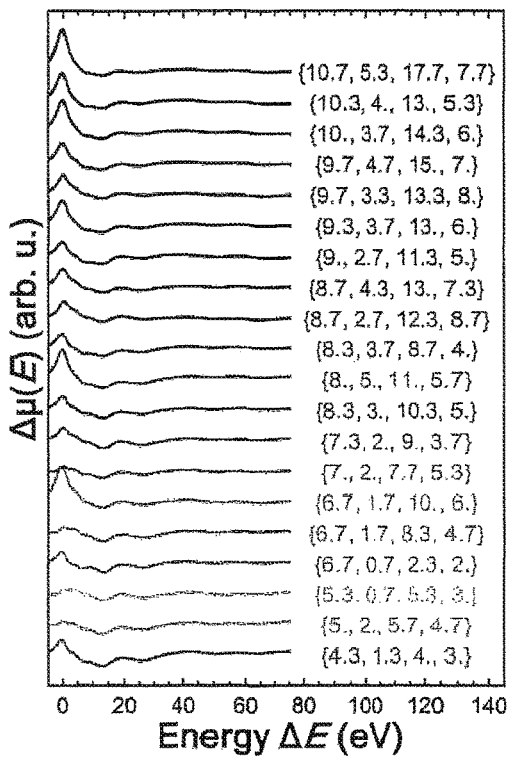
FIG. 7(b) shows a subset of a training data set constructed by using linear combinations of spectra calculated for the nanoparticles of FIG. 7(a), together with the corresponding averaged Coordination Numbers.
Figure 8A:
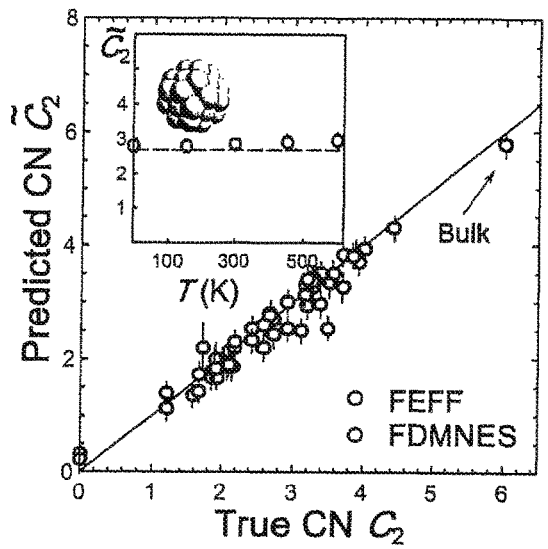
FIG. 8(a) shows true Coordination Numbers for the second coordination shell for particles, shown in FIGS. 4(a) and 7(a), compared with the Coordination Numbers predicted, in an embodiment of the invention, from XANES data.

FIGS. 7(a) and 7(b) show cluster models and theoretical XANES data for neural network training. Pt NPs used to construct training data set are shown in FIG. 7(a). Linear combinations of site-specific spectra, calculated for these NPs with FEFF or FDMNES codes, were used to construct training data set, a small subset of which is shown in FIG. 7(b) together with the corresponding averaged CNs. Bulk Pt XANES is subtracted from each spectrum, and spectra are shifted vertically for clarity.

Figure 8B:
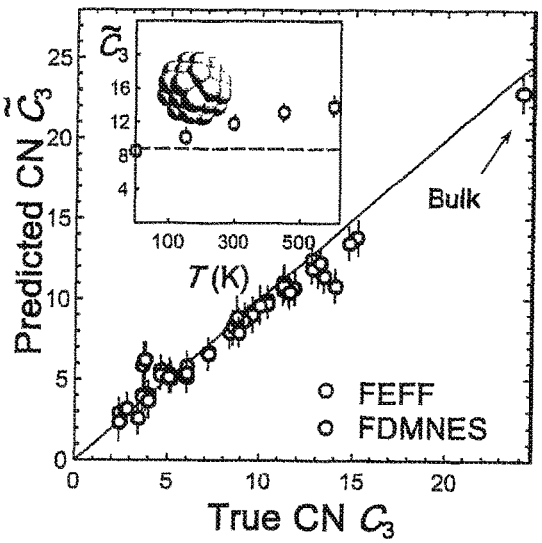
FIG. 8(b) shows true Coordination Numbers for the third coordination shell for particles, shown in FIGS. 4(a) and 7(a), compared with the Coordination Numbers predicted, in an embodiment of the invention, from XANES data.

FIGS. 8(a) and 8(b) illustrate validation of neural network using theoretical XANES data ($2^{nd}$ and $3^{rd}$ coordination shells). True coordination numbers for the $2^{nd}$ (FIG. 8(a)) and $3^{rd}$ (FIG. 8(b)) coordination shell for particles, shown in FIGS. 7(a) and 4(a), are compared with the CNs, predicted by neural network from SANES data, generated by FEFF or FDMNES codes. Solid lines—guides for eye. Coordination numbers, predicted by NN for truncated octahedral particle with 38 atoms from FEFF-generated SANES data, where thermal disorder was introduces using Debye model in the temperature range between 0 and 600 K, are shown in the insets. Debye temperature was set to bulk Pt value 244 K. Horizontal dashed lines show the true value of corresponding CN.

FIGS. 9(a) and 9(b) show Coordination Numbers predicted by neural network from experimental XANES ($2^{nd}$ and $3^{rd}$ coordination shells). Coordination numbers, predicted by NN method for the $1^{st}$ and $2^{nd}$ (FIG. 9(a)) and the $1^{st}$ and $3^{rd}$ (FIG. 9(b)) coordination shells are shown. Empty circles correspond to CNs for Pt model clusters with different sizes and shapes, obtained from fcc-type Pt structure, truncated along (100) or (111) planes, as well for clusters with icosahedral and hcp-type structures. Rectangles show the confidence regions for CNs, obtained for sample S3 from a multiple-scattering EXAFS.

Figure 10:
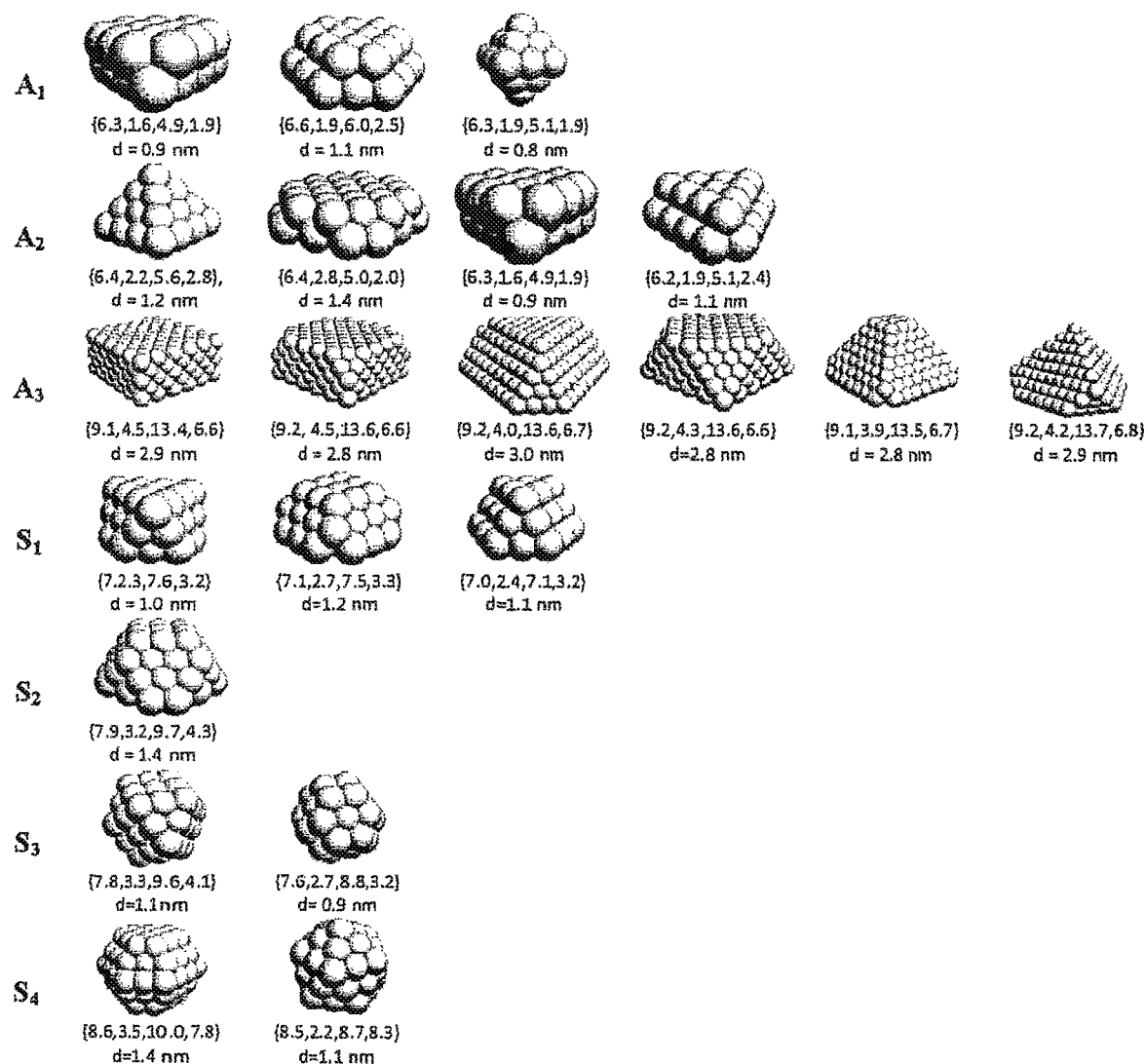
FIG. 10 depicts additional examples of structure models that have Coordination Numbers and sizes close to those estimated by Neural Network-based analysis in an embodiment of the invention.

FIG. 10 illustrates additional examples of structure models that have CNs and sizes close to those, estimated by neural network-based analysis of experimental XANES data and TEM analysis for Pt NPs on $\gamma$-Al$_2$O$_3$. CNs for the first four coordination shells (given in curly brackets) and particle size d for each of the shown models are close to those for structure models in Fig. (c). For sample A$_3$ only a small subset of possible (similar) structure models with close sizes and coordination numbers is shown.

RMC-EXAFS Analysis

For validation of structure models, obtained in NN/XANES analysis, RMC-EXAFS method was used with evolutionary algorithm (EA), as implemented in EvAX code. Each sample was represented as a small ensemble of NPs with the shape corresponding to NN/XANES results. The number of particles in each ensemble is chosen to have in total 300-500 atoms in the model. During RMC analysis, such composite model evolves via small random displacements of all atoms, with the aim to improve the agreement between experiment and theoretical EXAFS data. The maximal allowed displacements for atoms from their initial positions was constrained to be 0.4 Å to preserve the overall shape of particles.

For calculations of theoretical EXAFS spectra, FEFF8.5L code was used. To compare the calculated and experimental EXAFS data, Morlet wavelet transform (WT) was used: WTs of experimental and theoretical EXAFS are calculated, and the disagreement between experiment and theory is characterized as Euclidean distance between obtained WTs in the k-range between 3 and 15 Å$^{-1}$ and in R-range between 1.5 and 6 Å, thus including in the analysis contributions from the first six coordination shells and multiple-scattering contributions with up to 4th order. In details RMC-EXAFS procedure is described in Timoshenko, J.; Frenkel, A. I. Probing structural relaxation in nanosized catalysts by combining EXAFS and reverse Monte Carlo methods. *Catal. Today* 2017, 280, 274-282.

If the initial structure model is close to the structure of investigated material, a good agreement between experimental EXAFS and RMC simulations results can be expected. If, in turn, the chosen structure model does not represent the structure of the material, agreement between experimental data and theory will be noticeably worse. FIG. 11(a) demonstrates the results of such RMC-EXAFS simulations for structure models that were established based on the NN-XANES method. In addition, for sample S2, additional RMC-EXAFS simulation was carried out with structure models that had the 1st shell CN close to the one, predicted by NN-XANES method, but significantly different 2nd, 3rd and 4th CNs.

FIGS. 11(a) and 11(b) illustrate validation of Pt NPs 3D shapes, determined by the NN-XANES method, with RMC-EXAFS simulations. 3D shapes of particles ("good models"), corresponding to the coordination numbers (CNs), obtained in NN/XANES analysis were used as initial structure models for RMC-EXAFS simulations. Structure models, distorted by RMC method, are shown in the insets (note that they are almost indistinguishable from the original structure models, shown in FIG. 5(c)). Agreement between Fourier-transformed (FT) experimental EXAFS data and theoretical EXAFS, obtained in RMC simulations, is shown. In addition, for sample $S_2$, RMC simulations were carried out with the structure models ("bad model") that had the $1^{st}$ shell CN as predicted by NN/XANES method, but significantly different $2^{nd}$, $3^{rd}$ and $4^{th}$ CNs (the used hcp $Pt_{57}$ particle has CNs {8.0, 3.2, 8.5, 6.6}. As shown with the dashed lines, RMC-EXAFS spectrum for this model differs noticeably from experimental spectrum in the R range between 4 and 6 Å. FT-EXAFS spectra are shifted vertically for clarity.

As shown in FIGS. 11(a) and 11(b), while the models that agreed with the predictions of NN-XANES method resulted in a convincing agreement with the experimental EXAFS data, significantly worse agreement was obtained with the structure model that does not agree with the NN-XANES results, especially in the R range between 4 and 6 Å, corresponding to the contributions of distant coordination shells and multiple-scattering effects.

A good agreement obtained between experimental and theoretical EXAFS data after RMC simulations indicates that the structure models, yielded by NN-XANES method, indeed agree well with the available experimental EXAFS data. Besides structure model validation, RMC-EXAFS simulations with the structure models derived from NN-XANES analysis can be used to reconstruct the bond length distribution functions for the investigated samples and, hence, to extract information on average interatomic distances and disorder effects, which is not readily accessible from the NN-XANES method.

Local deviations of atomic positions from periodic lattice sites often result in unique structural motifs and functionalities in both bulk and nanomaterials. Local atomic displacements are also crucial in many processes, such as chemical reactions and phase transitions, and are often a key for explaining the properties and working mechanisms in functional materials. If correlation lengths for local distortions are shorter than the size of the coherent scattering region, these processes are difficult to observe by methods sensitive to long-range order. Additional challenges for detection and interpretation of structural transformations arise because they are often associated with low concentration or low dimensionality of the material, as well as high temperature or high pressure. In many cases the actual atomic displacements are also quite subtle, not exceeding 0.1-0.2 Å.

Extended x-ray absorption fine structure (EXAFS) spectroscopy has excellent sensitivity to local atomic displacements (with accuracy 0.01 Å and better), elemental specificity, and sensitivity to vibrational dynamics. EXAFS can be acquired in a broad range of experimental conditions; thus, this technique is well suited for in situ studies of structural transformations. New approaches are sought for extending the use of EXAFS beyond its most common application: analysis of the first few coordination shells and moderately ordered materials.

The ability to recognize patterns and correlations in large data sets provided by recent progress in machine learning (ML) offers new opportunities for extracting "hidden" information on local structure from experimental data. As demonstrated above, ML allows extraction of structure descriptors in nanoparticles from their x-ray absorption near edge structure (XANES). Discussed below is an approach for the interpretation of structural transitions and disorder effects in EXAFS data, to which sensitivity of XANES is limited. As discussed below, ML enables direct interpretation of EXAFS features in bulk and nanostructured materials in terms of atomistic radial distribution function (RDF) without assuming a particular disorder model. Furthermore, ML allows RDF extraction in the longer range of interatomic distances, compared to conventional analysis.

An embodiment of a method is illustrated on the example of bulk iron undergoing temperature-induced phase transition. At temperature ~1190 K the body-centered cubic structure (bcc) of iron a phase (ferrite) changes to a face-centered cubic structure (fcc) of γ phase (austenite). This phase transformation is an integral part of many technological processes, but its mechanism is far from being understood due to the experimental challenges in accurate characterization of the local structure changes. While a few high-pressure studies of iron appeared recently, no EXAFS studies of high-temperature bcc-to-fcc phase transition were reported, which can be attributed both to the difficulties of experimental measurements at such high temperature, and the corresponding challenges in EXAFS analysis. The latter problem is universal: at high temperatures EXAFS amplitude is reduced significantly by enhanced disorder effects, while anharmonicity of atomic thermal motion results in complex, asymmetric bond lengths distributions that are difficult to account for. These challenges are common for many structural transformations. As discussed below, the ML-based approach allows reliable extraction of the structural information on the short- and medium-range order at temperatures as high as 1300 K.

RDF g(R) is a key descriptor of local structure. Following changes in RDF, one can detect and characterize the phase transitions, alloying, structural motifs, and their transformations in nanoparticles. $EXAFS_x(k)$ (here k is the photoelectron wave number) can be expanded as $_x(k)=\Sigma_p X^p(k)$, where summation includes single-scattering and multiple-scattering (MS) contributions. For single scattering $$X^P(k) = \int_0^{+\infty} S_0^2 A_p(k, R) g_p(R) \sin[2kR + \phi_p(k, R)] \frac{dR}{R^2} \quad (1)$$

where $S_0^2$ $A_p$ and $\phi_p$ are the scattering amplitude and phase functions and $g_p(R)$ is partial RDF, corresponding to a specific coordination shell. Equation (1) can be generalized to include MS contributions by replacing $g_p(R)$ with corresponding many-atomic distribution functions.

Reconstruction of RDF from EXAFS spectra is an ill-posed problem, and relies on additional constraints and assumptions, such as (i) the shape of RDF peaks in conventional fitting approaches, (ii) the knowledge of the initial structure model and density of material in reverse Monte Carlo (RMC) simulations, and (iii) the non-negativity and smoothness of the RDF in regularization-like techniques. The constraints that work well for one material do not necessarily perform well for another, even less so for the transitional region between different phases. The development of constraints and fitting models is often subjective. An alternative is to rely for this purpose on a data-driven ML, where the parameters are optimized during the training stage, so that the routine gives accurate results for a broad range of relevant systems.

For extraction of RDF from EXAFS, an artificial neural network (NN) is used. The nonlinear sensitivity of NN to input features is the reason behind its unique ability to detect subtle fingerprints of local structure. As discussed above, NN is a composite function represented as a network of nodes, where the ith node in the nth NN layer performs a nonlinear operation on all inputs $X^{[n-1](j)}$, weighted with parameters $\theta^{[n][i,j]}$, and produces a single output $X^{[n][i]}$. By optimizing $\theta^{[n][i,j]}$, a sufficiently large NN can be trained to reproduce reliably the relationship between inputs and outputs.

Figure 12:
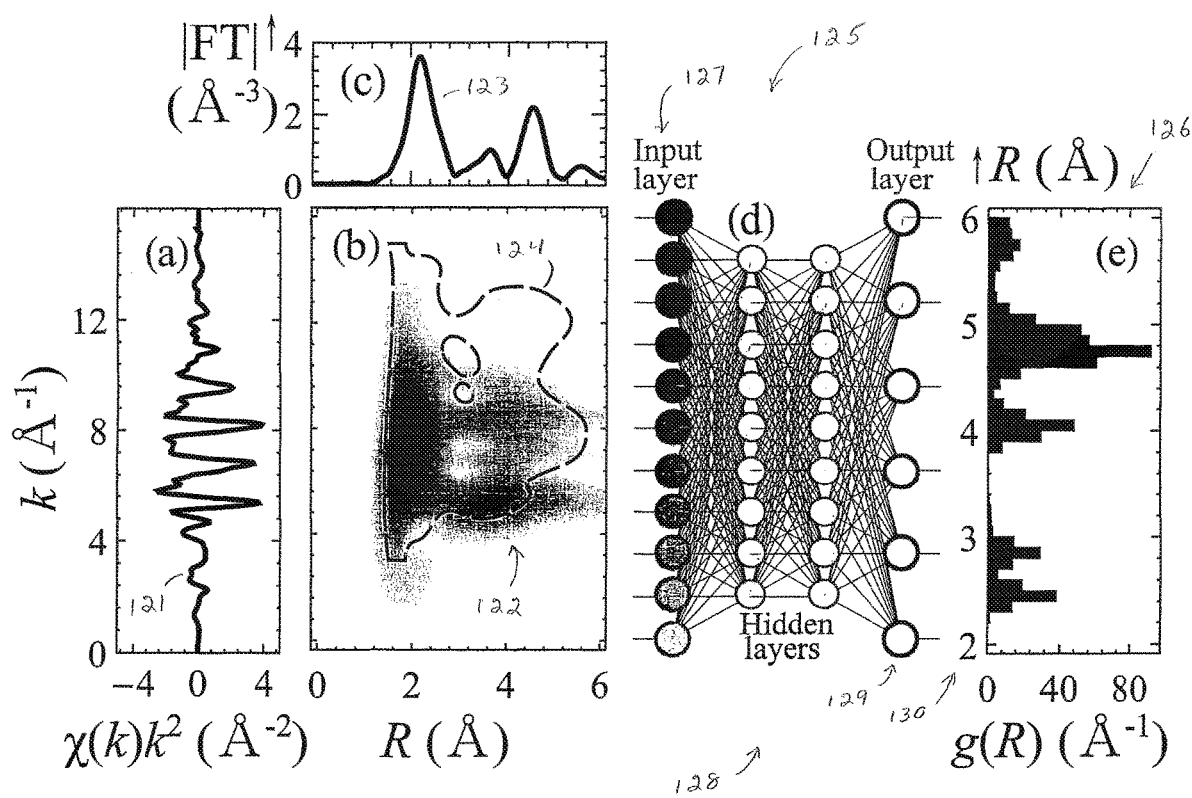
FIG. 12 illustrates a method and system in which an EXAFS spectrum is used, in an embodiment of the invention, to set the node values in a Neural Network input layer.

FIG. 12 illustrates a method and system for extraction of RDF from EXAFS in an embodiment of the invention. More specifically, FIG. 12 shows an Fe K-edge EXAFS 121 for bcc iron, and the modulus of its Morlet WT is shown at 122, while the modules of Fourier transform (FT) is shown at 123. The dashed line 124 indicated the region in k and R space, established as the most sensitive to structure variations. WT data are processed by NN 125, to map features in wavelet-transformed spectra to the features in RDF, approximated with a histogram 126.

In the approach disclosed herein, illustrated in FIG. 12, an EXAFS spectrum is used to set the node values in the NN input layer 127. Here, instead of discretizing EXAFS in k space, or Fourier transforming it to frequency (R) space 123, wavelet transformation (WT) 122 is used, which represents EXAFS spectrum in k and R spaces simultaneously. Only the WT points that are sensitive to structure changes are used: this region 124 in k and R space is shown in FIG. 12, and is obtained automatically based on the analysis of variations in the training spectra. The wavelet-transformed spectra are then processed by the nodes in the NN further layers 128, 129. The output layer 129 of the NN produces a vector 130, which encodes the entire RDF, approximated with a histogram 126 in a given R range between $R_{min}$ and $R_{max}$: each NN output node yields the height of a particular histogram bin.

The crucial part of NN analysis is the training process. Here, as input to the NN a set of EXAFS spectra x is supplied, for which the corresponding RDFs $g_t(R)$ are known. This true g(R) is compared with the NN output $\tilde{g}_t(R)$, and the NN weights $\theta^{[n][i,j]}$ are updated, so that the difference between $\tilde{g}_t(R)$ and $g_t(R)$ is minimized for all training spectra. It is not feasible to construct such a training set based on experimental measurements. Note also that to have a reliable, unbiased NN, the training set should represent a large portion of configurational space, not limited to a relatively small number of experimentally available structures. To solve this problem, classical molecular dynamics (MD) is used to create ~3000 training examples, corresponding to different phases of iron and different degrees of disorder. Knowing the atomic trajectories in MD simulations, the corresponding RDFs are calculated, as well as the corresponding time- and ensemble-averaged EXAFS (MD-EXAFS). As demonstrated above, MD allows one to generate EXAFS spectra in a qualitative agreement with experimental data. A very accurate agreement between MD-EXAFS and experimental EXAFS is not required here, since MD-EXAFS data are used solely for the purpose of establishing the relation between EXAFS and RDF features, and not for direct matching with experimental data. For MD, Sutton-Chen type potential is used. To calculate MD-EXAFS spectra (FIG. 2) the same procedure is used as in [J. Timoshenko and A. I. Frenkel, *Catal. Today* 280, 274 (2017) and J. Timoshenko, K. K. Keller, and A. I. Frenkel, *J. Chem. Phys.* 146, 114201 (2017)].

Figure 13:
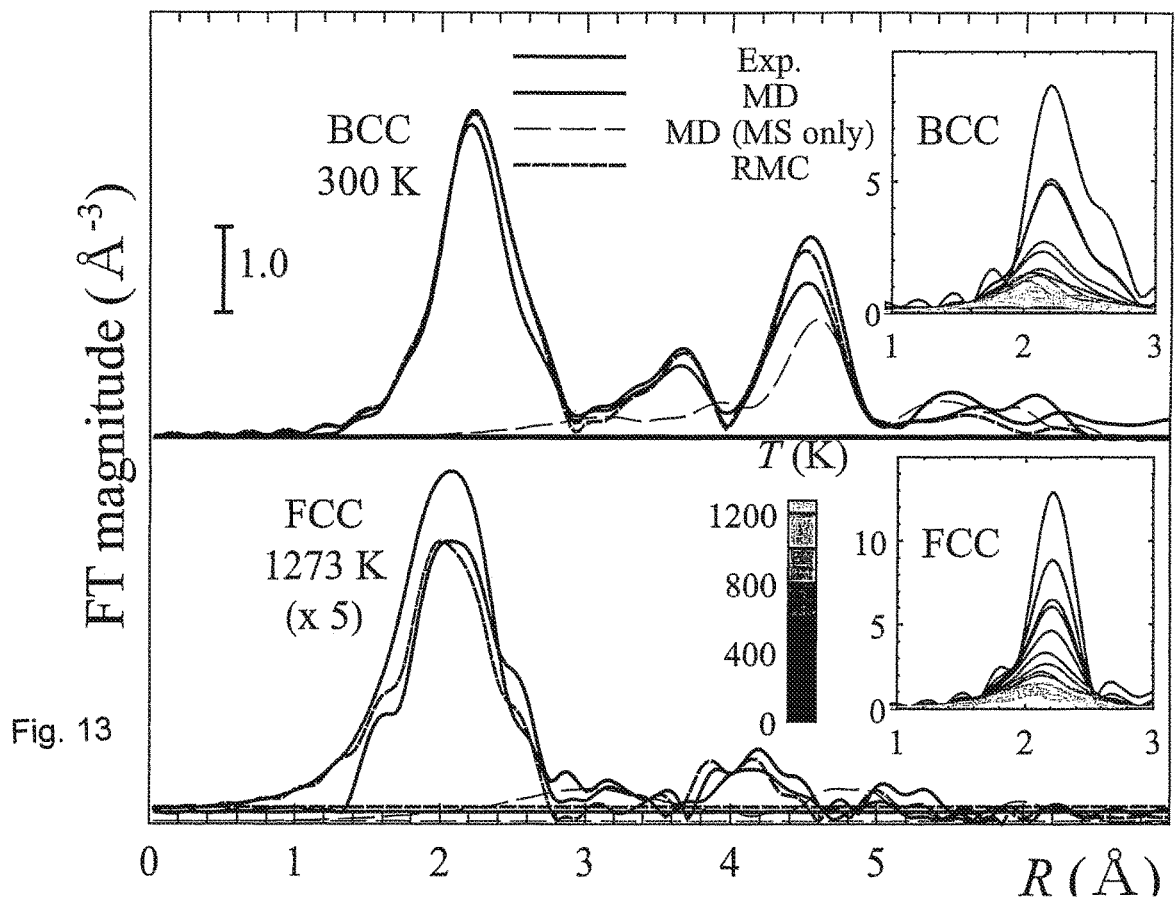
FIG. 13 shows Fourier-transformed experimental and simulated Fe K-edge EXAFS for a bulk iron sample.

FIG. 13 illustrates a procedure to calculate MD-EXAFS spectra. More specifically, FIG. 13 shows Fourier-transformed experimental and simulated (with MD and RMC methods) Fe K-edge EXAFS for bulk iron at 300 and 1273 K temperatures. Contribution of MS paths to the total MD-EXAFS is shown separately. Spectra corresponding to 1273 K are shifted vertically and multiplied by 5. Insets show the temperature dependencies of MD-EXAFS for bcc and fcc structures (only the main FT-EXAFS peak).

MD simulations were carried out for iron with bcc, fcc, and hexagonal close-packed (hcp) structures in the temperature range from 10 up to 1500 K. FIG. 13 compares the calculated MD-EXAFS with the experimental data for bcc iron at room temperature [FIG. 13 at a] and fcc iron at 1273 K [FIG. 13 at b]. MD describes reasonably the experimental room temperature EXAFS, and gives qualitative agreement with the high temperature data. In the latter case, the disorder in the first coordination shell is underestimated in simulations, as evidenced by the higher main FT peak. The temperature-dependent MD-EXAFS spectra are shown in the insets and were used for NN training, and also for validation of its accuracy [see above, (FIGS. 6, 7(a) and 7(b))].

The experimental Fe K-edge EXAFS, reported in FIG. 13, were recorded in situ in transmission mode at the ELETTRA synchrotron. A 40% detuned Si (111) double-crystal monochromator was used. The intensities of the incident and transmitted x-ray beams were measured by two ionization chambers filled with argon and krypton gases. High purity iron foil (Goodfellow, 99.99+%) with the thickness of 4 μm was used as a sample. The sample temperature was controlled in the range from 300 to 1273 K using the L' Aquila-Camerino vacuum glass furnace. To avoid any contact with the graphite foil heater of the furnace (the graphite was necessary for transmission x-ray experiment) and to prevent the sample from oxidation and carbidization that plague most high temperature experiments with pure iron, the sample was gently packed between two BN pellets. Note that BN is thermally stable up to ~3200 K, but reacts with iron at ~1400 K.

Figures 14A, 14B:
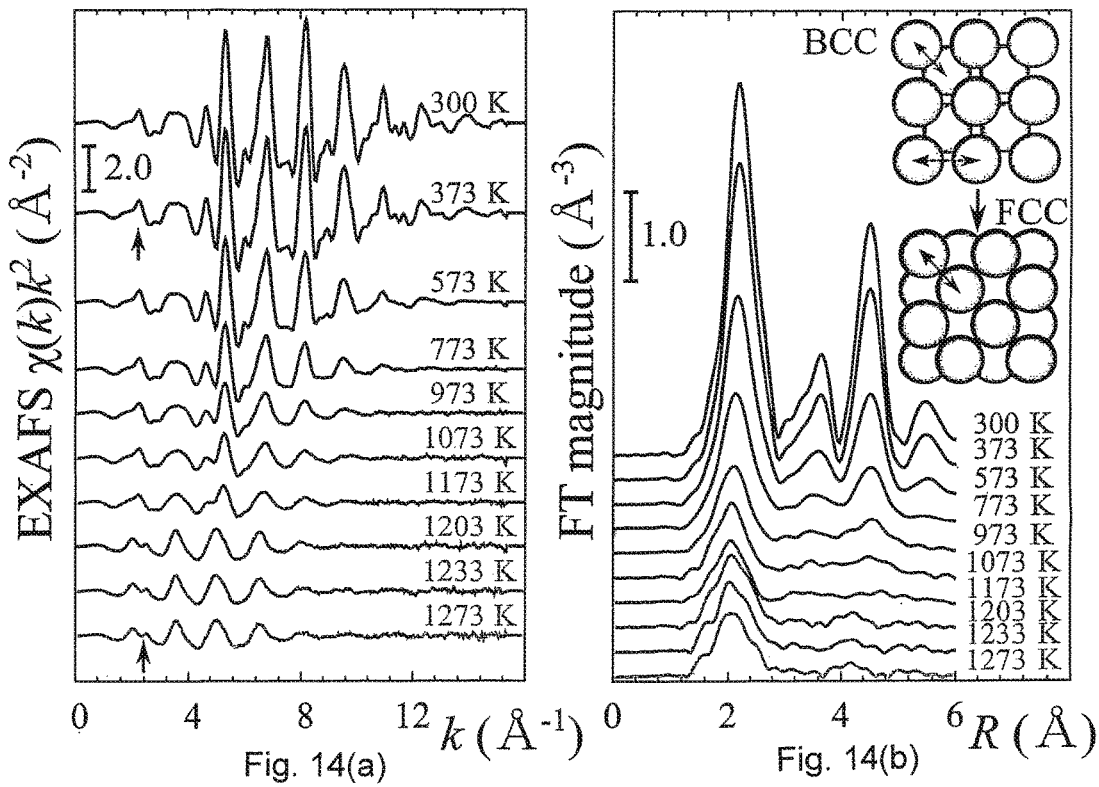
FIG. 14(a) shows experimental Fe K-edge EXAFS in k space for temperatures between 300 and 1273 K.
FIG. 14(b) shows experimental Fe K-edge EXAFS in R space for temperatures between 300 and 1273 K.

Temperature dependencies of the obtained experimental spectra are shown in FIGS. 14(a) and 14(b). More specifically, FIGS. 14(a) and 14(b) show experimental Fe K-edge EXAFS in k space (FIG. 14(a)) and R space (FIG. 14(b)) for temperatures between 300 and 1273 K. Arrows in FIG. 14(a) indicate the features in the low k range, whose change implies the phase transition from the bcc to fcc structure (inset in FIG. 14(b)). Arrows in the inset show the atomic pairs contributing to the main FT-EXAFS peak in both structures.

The good signal-to-noise ratio is observed in the k-space data [FIG. 14(a)] even at the highest temperature. The lack of features at low R values (around ~1 A) in Fourier-transformed data [FIG. 14(b)] together with the stability of all XANES features (discussed above, FIGS. 8(a) and 8(b)) gives confidence that the metallic state of iron is preserved in the measurements.

An indirect indication of the transition from a bcc to a fcc structure [see the inset in FIG. 14(b)] is the change in the features at low k values, marked in FIG. 14(a). These features cannot be included in EXAFS analysis due to the artifacts of background subtraction and inaccuracies of EXAFS theory in this region. The changes in features at higher k values (k>3 Å$^{-1}$) and in R space are subtler and masked by the temperature effect. In particular, both bcc and fcc structures yield a single nearest neighbor peak to the R-space spectrum between ca 1.5 and 3 Å, FIG. 3(b). It is known, however, that these two structures have different nearest neighbor RDFs: in the ideal bcc structure with lattice constant $a_0$ each atom is surrounded by 8 atoms at the distance $a_0\sqrt{3}/2$, and 6 atoms at the distance $a_0$. In the ideal fcc structure all atoms are surrounded by 12 nearest neighbors at the same distance $a_0/\sqrt{2}$. The corresponding pairs of atoms are shown in the inset of FIG. 14(b).

Figure 15A:
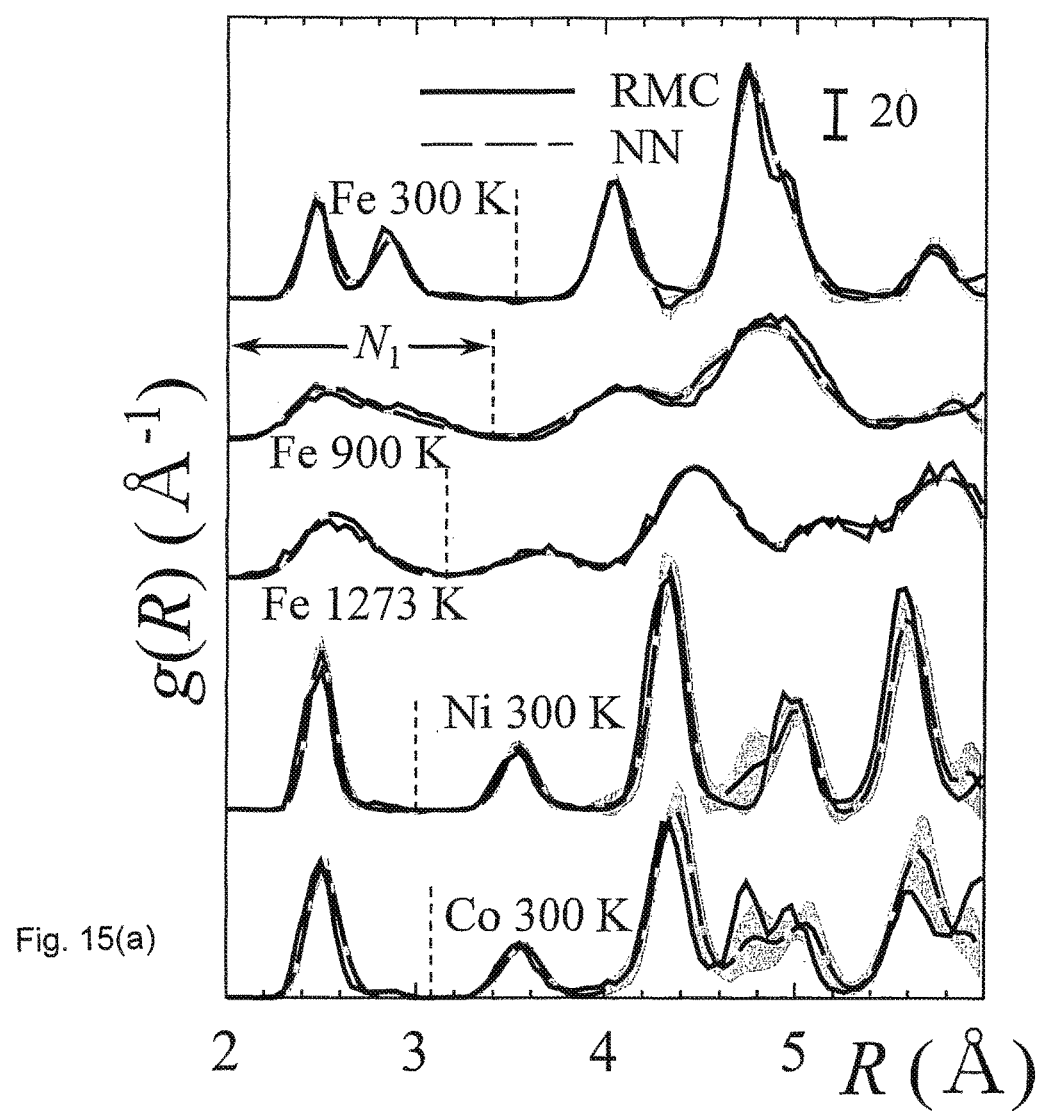
FIG. 15(a) illustrates radial distribution functions (RDFs) for iron at 300, 900, and 1273 K, and for nickel (fcc) and cobalt (hcp), obtained by Neural Network from experimental EXAFS.
Figure 15B:
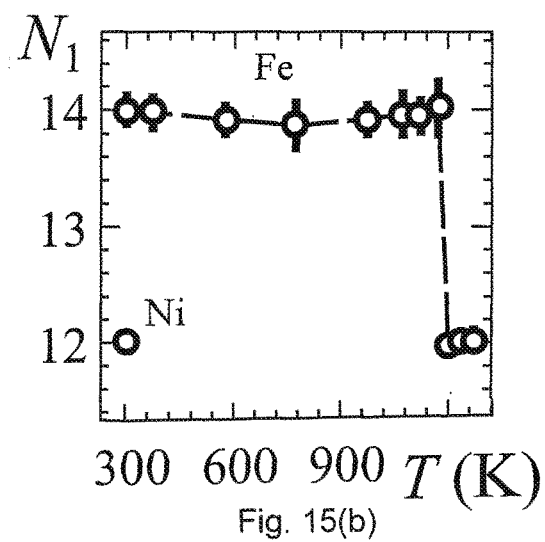
FIG. 15(b) shows the temperature dependencies of the Coordination Numbers for nearest neighbors (first coordination shell) $N_1$.
Figure 15C:
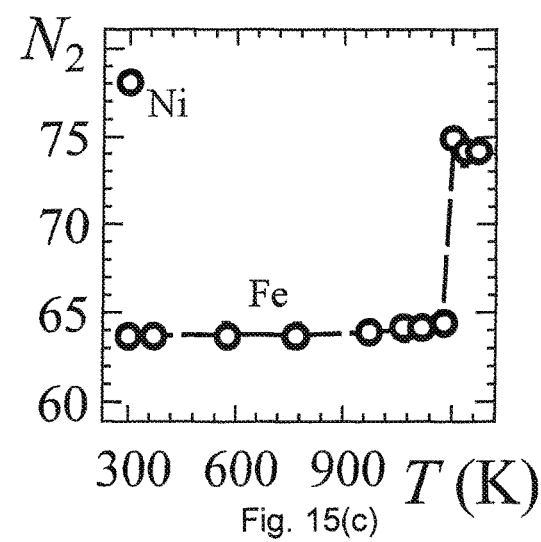
FIG. 15(c) shows the temperature dependencies of the total Coordination Numbers for more distant coordination shells $N_2$.

In FIGS. 15(a), 15(b) and 15(c). 4, NN, trained on MD-EXAFS spectra, is applied to the analysis of experimental data. FIG. 15(a) shows RDFs for iron at 300, 900, and 1273 K, and for nickel (fcc) and cobalt (hcp), obtained by NN from experimental EXAFS. Dashed line in FIG. 15(a) is the averaged result from 10 independently trained NNs, shaded regions show the standard deviation of these results and characterize the uncertainty. For comparison, the results of RMC simulations are also shown. The $R_1$ value is shown as a vertical dashed line. Temperature dependencies of integrated RDFs $N_1$ and $N_2$ are shown with empty circles in FIGS. 15(b) and 15(c). Dashed lines in FIGS. 15(b) and 15(c) are a guide for the eye.

RDFs, reconstructed by NN from experimental Fe K-edge EXAFS in bulk iron are shown in FIG. 15(a) (for selected temperatures) and in FIGS. 9(a) and 9(b). The obtained RDFs $\tilde{g}(R)$ are smooth and non-negative functions for all values of R. As expected, at low temperature the RDF between 2 and 4 Å is split in two peaks, in agreement with the bcc-type structure. At higher temperatures, RDF peaks broaden and merge together. To analyze quantitatively the obtained RDFs and to detect bcc-to-fcc phase transition, the running coordination number is calculated:
$N_{RCN}(R)=\int_0^R \tilde{g}(r)dr$. $N_{RCN}(R)$ yields a plateau in between coordination shells, which can be used to calculate the coordination numbers N of a single shell or a group of adjacent shells. For example, $N_1=N_{RCN}(R_1)$, where $R_1$ is the minimum of $\tilde{g}(R)$ in the R range between 2.5 and 3.5 Å, includes contribution of the first coordination shell for fcc iron, and first two coordination shells in bcc iron; thus, it is equal to 12 in fcc-type and 8+6=14 in bcc-type material. The obtained temperature dependence of $N_1$ is shown in FIG. 4(b), and demonstrates a sharp transition from a bcc-like to a fcc-like environment between 1173 and 1203 K. Simultaneously, the average density of the structure sharply increases, as evidenced by the integrated contribution of distant coordination shells $N_2=N_{RCN}(R_{max})$ [FIG. 15(c)]. Sharp transformation from a bcc-like to denser fcc-like structure in both cases agrees with the expected behavior for structure parameters in the first-order phase transition.

The NN approach disclosed herein succeeded to obtain local structure information in iron in the broad temperature range and with much better detail than conventional EXAFS analysis. While the construction of the training sets took days of CPU time and the training of NN took hours, the calculation of the RDF for any given EXAFS spectrum using the prebuilt NN took only a few seconds. As an additional validation of the NN-based method disclosed herein, RMC simulations were performed, as described in Refs. [J. Timoshenko and A. I. Frenkel, *Catal. Today* 280, 274 (2017) and J. Timoshenko, A. Kuzmin, and J. Purans, *J. Phys. Condens. Matter* 26, 055401 (2014)], to independently obtain the RDF. Unlike it is for the NN method, RMC simulations require several CPU weeks of calculations for each EXAFS spectrum and a priori knowledge of crystallographical structure: here for choosing between bcc and fcc models, NN results were used, while the lattice parameters were taken from Z. Baskinski, W. Hume-Rothery, and A. Sutton, *Proc. R. Soc. A* 229, 459 (1955). The agreement between the RMC-modeled and experimental EXAFS is shown in FIG. 13 and demonstrates the high accuracy of the RMC-generated structure models both at room temperature (bcc structure) and high temperature (fcc structure). On the other hand, it shows that the experimental EXAFS data agree with the average structure model from XRD, and is also a testimony to the success of the experimental procedure that was used to ensure that no unwanted Fe species are present in the sample.

The RDFs, obtained from NN analysis, are compared with RMC results in FIG. 15(a) and FIGS. 9(a) and 9(b), and confirm the high accuracy of the NN-based method described above: even at the highest temperature, the asymmetric shapes of RDF peaks up to 6 Å are reproduced reliably by NN. Note that the current 6 Å limit is imposed only by the number of photoelectron paths, included in EXAFS calculations, and the analysis, in principle, can be extended to even more distant coordination shells.

In addition, NN-based analysis performs substantially better than a trivial matching of theoretical spectra with experimental data.

Since in bulk iron the fcc structure is observed only at high temperature, to demonstrate the ability of the method disclosed herein to recognize well-ordered low-temperature fcc-type structures, the method is applied to Ni K-edge EXAFS in bulk Ni, which has fcc structure at room temperature (FIG. 15(a)). The NN was trained on theoretical Fe K-edge spectra only. However, since Ni and Fe are neighbors in the periodic table, their photoelectron scattering properties are close, and one can use the NN, trained on iron data, to analyze nickel data as well. As shown in FIG. 15(a), the NN correctly predicts the fcc-type structure for Ni, and the shapes of RDF peaks are in an excellent agreement with RMC results. One can also find the one-to-one correspondence between the RDF features in the result for Ni at room temperature and Fe at high temperature. Similar reasoning allows us to employ the NN to analyze Co K-edge EXAFS from bulk cobalt that, at room temperature, assumes the hcp-type structure. As shown in FIG. 15(a), NN gives excellent results in this case as well. Importantly, NN can detect the splitting of the RDF peak between ~4.5 and 5.0 Å, which distinguishes the RDF of hcp-type cobalt from that of the fcc-type Ni. The ability of the NN to detect the differences between the fcc and hcp structures from EXAFS spectra is remarkable, since it is almost impossible to detect this subtle difference by other approaches to EXAFS analysis.

In embodiments of the invention, the neural network-based method enables accurate and fast extraction of structural information from experimental EXAFS. The advantage of this approach over existing analysis methods was demonstrated on the example of the in situ study of high-temperature structural transition from ferrite to austenite. The NN-based method can immediately be applied to the local structure analyses in Fe, Ni, Co, and Mn metals, as well as in their alloys. The NN-based method can also be easily generalized to other systems (including nonmetallic, multi-component materials). Embodiments of the invention may be used for in situ monitoring of structural transformations in nanostructured materials. In addition, embodiments of the method, developed here for deciphering EXAFS spectra, may be useful for the analysis of other structure-sensitive data, e.g., for analysis of pair-distribution functions from the total x-ray or neutron scattering data, where one faces similar challenges in data analysis as in EXAFS spectroscopy. The trained NNs can be shared (since they are explicit functions), and a library of NNs, trained for specific tasks (e.g., processing of EXAFS and XANES data in different materials) can be developed, allowing the researchers in the field to analyze their own data without the need to do the tedious NN training process themselves.

While the invention has been shown and described with reference to certain embodiments of the present invention thereof, it will be understood by those skilled in the art that various changes in from and details may be made therein without departing from the spirit and scope of the present invention and equivalents thereof.

The invention claimed is:

1. A method of supervised machine learning-based spectrum analysis, using a neural network trained with spectrum information to identify a specified feature of a given material, the method comprising:
   inputting into the neural network spectrum data obtained from a sample of the given material; and
   the neural network processing the spectrum data obtained from the sample of the material, in accordance with the training of the neural network, and outputting one or more values for the specified feature of the sample of the material, wherein the inputting into the neural network spectrum data obtained from a sample of the given material includes inputting into the neural network x-ray absorption spectroscopy data obtained from the sample of the given material.

2. The method according to claim 1, wherein the specified feature includes a structural parameter of the given material.

3. The method according to claim 1, wherein the sample of the material comprises a given type of nanoparticles.

4. The method according to claim 3, wherein the specified feature includes a set of coordination numbers of a coordination shell of the given type of nanoparticles.

5. The method according to claim 1, wherein:
   the specified feature includes a radial distribution function of atoms in the sample of the material; and
   the inputting into the neural network spectrum data obtained from a sample of the given material includes obtaining the structure spectra data from the sample of the given material while the sample of the given material is undergoing transition.

6. The method according to claim 1, further comprising using the output value of the neural network to identify one or more structural features of the sample of the given material.

7. The method according to claim 1, wherein the neural network processing the spectrum data obtained from the sample of the material includes the neural network processing x-ray absorption near-edge spectroscopy data of said input x-ray absorption spectroscopy data to determine the one or more values for the specified feature of the sample of the material.

8. The method according to claim 1, wherein the neural network processing the spectrum data obtained from the sample of the material includes the neural network processing extended x-ray absorption fine-structure spectroscopy data of said input x-ray absorption spectroscopy data to determine the one or more values for the specified feature of the sample of the material.

9. The method according to claim 1, wherein the neural network processing the spectrum data obtained from the sample of the material includes the neural network identifying spectral regions, in the spectrum data, relevant for structure determination of the sample of the material, based on information extracted from the training.

10. A system for supervised machine learning-based spectrum analysis, the system comprising:
    a neural network trained with spectrum information to identify a specified feature of a given material,
    the neural network for receiving spectrum data obtained from a sample of the given material; and
    the neural network for processing the spectrum data obtained from the sample of the material, in accordance with the training of the neural network, and outputting one or more values for the specified feature of the sample of the material, wherein the inputting into the neural network spectrum data obtained from a sample of the given material includes inputting into the neural network x-ray absorption spectroscopy data obtained from the sample of the given material.

11. The system according to claim 10, wherein the specified feature includes a structural parameter of the given material.

12. The system according to claim 10, wherein:
    the given type of material comprises a given type of nanoparticles; and
    the specified feature includes a set of coordination numbers of a coordination shell of the given type of nanoparticles.

13. The system according to claim 10, wherein the specified feature includes a radial distribution function of atoms in the sample of the given material.

14. The system according to claim 10, wherein the processing the spectrum data obtained from the sample of the material includes processing x-ray absorption near-edge spectroscopy data of said input x-ray absorption spectroscopy data obtained from the sample of the material to determine the one or more values for the specified feature of the sample of the material.

15. A method of training a neural network to analyze spectrum data, the method comprising:
    inputting into the neural network a training set of data including spectrum data obtained from a given material, the neural network including a multitude of nodes arranged in a plurality of layers, each of the nodes having an associated value, and said spectrum data being associated with a true value for a specified feature of the given type of material;
    the neural network processing said training set of data and outputting an output value for the specified feature of the given type of material; and
    adjusting the values of the nodes of the neural network to achieve a defined relationship between the output value of the neural network for the specified feature of the given type of material and the true value for said specified feature.

16. The method according to claim 15, wherein the training set of data are theoretical data constructed using spectra simulations.

17. The method according to claim 15, wherein the training set of data includes x-ray absorption spectroscopy data for the given material.

18. The method according to claim 15, wherein the training set of data includes electron energy loss spectra (EELS) data.

19. The method according to claim 15, wherein:
    the given material comprises a given type of nanoparticles; and the specified feature includes a set of coordination numbers of a coordination shell of the given type of nanoparticles.

20. A method of supervised machine learning-based spectrum analysis, using a neural network trained with spectrum information to identify a specified feature of a given material, the method comprising:

inputting into the neural network spectrum data obtained from a sample of the given material; and the neural network processing the spectrum data obtained from the sample of the material, in accordance with the training of the neural network, and outputting one or more values for the specified feature of the sample of the material, wherein:

the sample of the material comprises a given type of nanoparticles; and the specified feature includes a set of coordination numbers of a coordination shell of the given type of nanoparticles.

21. A method of supervised machine learning-based spectrum analysis, using a neural network trained with spectrum information to identify a specified feature of a given material, the method comprising:

inputting into the neural network spectrum data obtained from a sample of the given material; and the neural network processing the spectrum data obtained from the sample of the material, in accordance with the training of the neural network, and outputting one or more values for the specified feature of the sample of the material, wherein:

the specified feature includes a radial distribution function of atoms in the sample of the material; and the inputting into the neural network spectrum data obtained from a sample of the given material includes obtaining the structure spectra data from the sample of the given material while the sample of the given material is undergoing transition.

22. A method of supervised machine learning-based spectrum analysis, using a neural network trained with spectrum information to identify a specified feature of a given material, the method comprising:

inputting into the neural network spectrum data obtained from a sample of the given material; and the neural network processing the spectrum data obtained from the sample of the material, in accordance with the training of the neural network, and outputting one or more values for the specified feature of the sample of the material, wherein:

the inputting into the neural network spectrum data obtained from a sample of the given material includes inputting into the neural network x-ray absorption spectroscopy data obtained from the sample of the given material; and the neural network processing the spectrum data obtained from the sample of the material includes the neural network processing x-ray absorption near-edge spectroscopy data of said input x-ray absorption spectroscopy data to determine the one or more values for the specified feature of the sample of the material.

23. A method of supervised machine learning-based spectrum analysis, using a neural network trained with spectrum information to identify a specified feature of a given material, the method comprising:

inputting into the neural network spectrum data obtained from a sample of the given material; and the neural network processing the spectrum data obtained from the sample of the material, in accordance with the training of the neural network, and outputting one or more values for the specified feature of the sample of the material, wherein:

the inputting into the neural network spectrum data obtained from a sample of the given material includes inputting into the neural network x-ray absorption spectroscopy data obtained from the sample of the given material; and the neural network processing the spectrum data obtained from the sample of the material includes the neural network processing extended x-ray absorption fine-structure spectroscopy data of said input x-ray absorption spectroscopy data to determine the one or more values for the specified feature of the sample of the material.

24. A method of supervised machine learning-based spectrum analysis, using a neural network trained with spectrum information to identify a specified feature of a given material, the method comprising:

inputting into the neural network spectrum data obtained from a sample of the given material; and the neural network processing the spectrum data obtained from the sample of the material, in accordance with the training of the neural network, and outputting one or more values for the specified feature of the sample of the material, wherein:

the neural network processing the spectrum data obtained from the sample of the material includes the neural network identifying spectral regions, in the spectrum data, relevant for structure determination of the sample of the material, based on information extracted from the training.

25. A system for supervised machine learning-based spectrum analysis, the system comprising:

a neural network trained with spectrum information to identify a specified feature of a given material, the neural network for receiving spectrum data obtained from a sample of the given material; and the neural network for processing the spectrum data obtained from the sample of the material, in accordance with the training of the neural network, and outputting one or more values for the specified feature of the sample of the material, wherein:

the given type of material comprises a given type of nanoparticles; and the specified feature includes a set of coordination numbers of a coordination shell of the given type of nanoparticles.

26. A system for supervised machine learning-based spectrum analysis, the system comprising:

a neural network trained with spectrum information to identify a specified feature of a given material, the neural network for receiving spectrum data obtained from a sample of the given material; and the neural network for processing the spectrum data obtained from the sample of the material, in accordance with the training of the neural network, and outputting one or more values for the specified feature of the sample of the material, wherein:

the specified feature includes a radial distribution function of atoms in the sample of the given material.

27. A system for supervised machine learning-based spectrum analysis, the system comprising:

a neural network trained with spectrum information to identify a specified feature of a given material, the neural network for receiving spectrum data obtained from a sample of the given material; and the neural network for processing the spectrum data obtained from the sample of the material, in accordance with the training of the neural network, and outputting one or more values for the specified feature of the sample of the material, wherein:

the processing the spectrum data obtained from the sample of the material includes processing x-ray absorption near-edge spectroscopy data obtained from the sample of the material to determine the one or more values for the specified feature of the sample of the material.

* * * * *